(12) United States Patent
Inoue et al.

(10) Patent No.: US 7,455,425 B2
(45) Date of Patent: Nov. 25, 2008

(54) BACKLIGHT UNIT AND LIQUID CRYSTAL DISPLAY DEVICE USING THE BACKLIGHT UNIT

(75) Inventors: Yutaka Inoue, Suzuka (JP); Kohji Ohtsuka, Tochigi (JP); Kazuyoshi Izumi, Tochigi (JP); Takashi Yoshii, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 180 days.

(21) Appl. No.: 10/531,919

(22) PCT Filed: Oct. 17, 2003

(86) PCT No.: PCT/JP03/13357

§ 371 (c)(1),
(2), (4) Date: Nov. 10, 2005

(87) PCT Pub. No.: WO2004/038283

PCT Pub. Date: May 6, 2004

(65) Prior Publication Data

US 2006/0139952 A1    Jun. 29, 2006

(30) Foreign Application Priority Data

Oct. 22, 2002 (JP) .............................. 2002-307011
Oct. 22, 2002 (JP) .............................. 2002-307012
Dec. 19, 2002 (JP) .............................. 2002-368359

(51) Int. Cl.
*F21V 1/00* (2006.01)

(52) U.S. Cl. .................... 362/241; 362/97; 362/332; 362/297

(58) Field of Classification Search .................. 362/97, 362/241, 332, 297–298, 301, 225, 249, 346, 362/252, 235, 245, 242–243, 247, 296, 300
See application file for complete search history.

(56) References Cited

U.S. PATENT DOCUMENTS 4,335,421 A *  6/1982  Modia et al. ................. 362/223
6,364,505 B1 *  4/2002  Shoenfeld .................... 362/241

(Continued)

FOREIGN PATENT DOCUMENTS

JP          61-133502 A      6/1986

(Continued)

*Primary Examiner*—Anabel M Ton
*Assistant Examiner*—Julie A Shallenberger
(74) *Attorney, Agent, or Firm*—Birch, Stewart, Kolasch & Birch, LLP

(57) ABSTRACT

A backlight unit includes a fluorescent lamp to illuminate a liquid crystal panel, a reflection unit for causing the light from the fluorescent lamp to exit toward a certain direction, and a diffusion unit for diffusing the light from the fluorescent lamp and reflection unit, and reflectance or transmittance in the horizontal and vertical directions is controlled by applying a dot pattern that gradually increases densities from the central portion toward the peripheral portion to the reflection unit or diffusion unit, or by applying a dot pattern that gradually increased densities from the central portion toward the both ends in the longitudinal direction on the surface of the fluorescent tube of the fluorescent lamp. By doing this, brightness gradient is formed in the horizontal and vertical directions so that the brightness in the central portion of the liquid crystal panel is relatively higher than the brightness of the peripheral portion thereof.

10 Claims, 21 Drawing Sheets

U.S. PATENT DOCUMENTS 6,494,587 B1 * 12/2002 Shaw et al. .................... 362/29
2003/0210222 A1 * 11/2003 Ogiwara et al. ............. 345/103

FOREIGN PATENT DOCUMENTS

| JP | 62-40151 A | 2/1987 |
| JP | 04-275526 A | 10/1992 |
| JP | 4133 A | 1/1993 |
| JP | 6-75216 | 3/1994 |
| JP | 06-265732 A | 9/1994 |
| JP | 07-140528 | 6/1995 |
| JP | 7-191311 A | 7/1995 |
| JP | 07-261175 A | 10/1995 |
| JP | 07-272507 A | 10/1995 |
| JP | 8-32120 A | 2/1996 |
| JP | 9-45121 A | 2/1997 |
| JP | 11-119217 A | 4/1999 |
| JP | 11-295731 A | 10/1999 |
| JP | 2000-137223 A | 5/2000 |
| JP | 2002-40453 A | 2/2002 |
| JP | 2002-55675 A | 2/2002 |
| JP | 2002-75038 A | 3/2002 |
| JP | 2002-82626 A | 3/2002 |
| JP | 2002-202507 | 7/2002 |

* cited by examiner

FIG.11
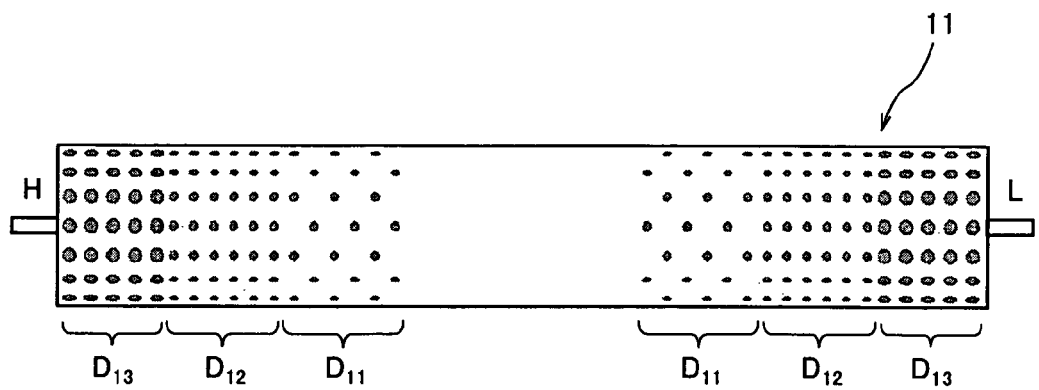
FIG.12A  FIG.12B  FIG.12C
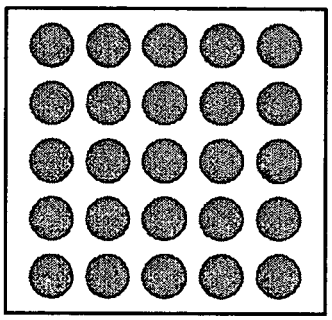 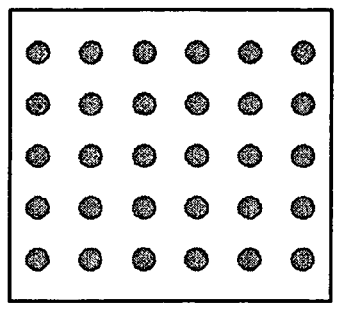 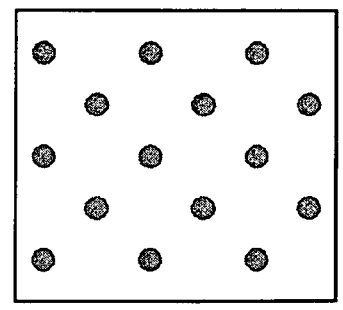

FIG.16A
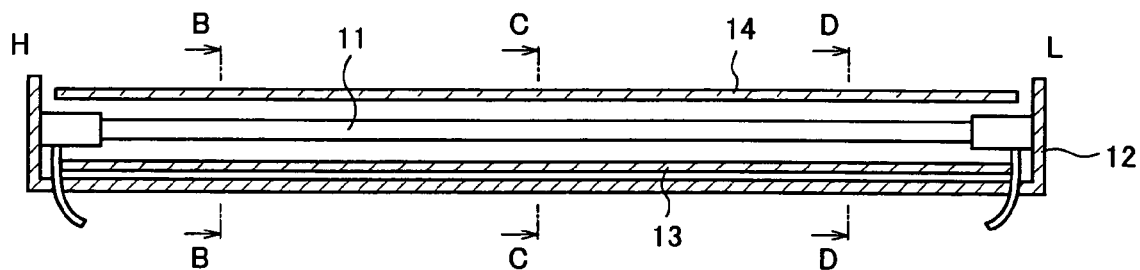
FIG.16B  FIG.16C  FIG.16D
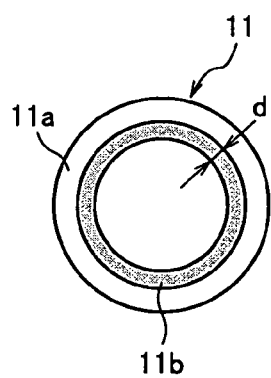 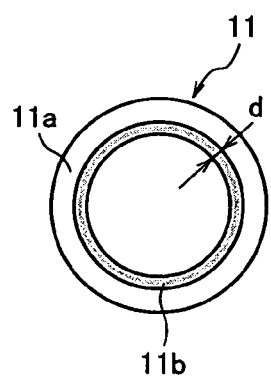 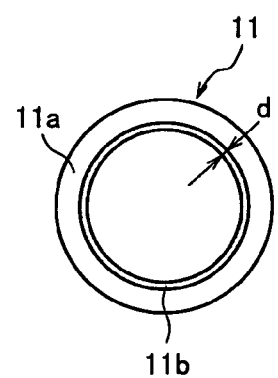

BACKLIGHT UNIT AND LIQUID CRYSTAL DISPLAY DEVICE USING THE BACKLIGHT UNIT

TECHNICAL FIELD

The present invention relates to a backlight unit for lighting an object from the rear side, and to a liquid crystal display device using the backlight unit.

BACKGROUND OF THE INVENTION

High image rendering capabilities have been demanded for a display device represented by a television set and projector device. Especially, optimized design of a display device has been studied to implement technological means that provides a viewer with the feelings of presence and immersion. To implement these feelings of presence and immersion, standardizations have been progressed through optimization of the relationship between viewing angle characteristics of a man and display screen sizes. That is, attempts have been made to improve these image rendering capabilities by rendering images with a screen size that is suitable for human viewing angle characteristics.

Generally, visual field of a man is classified into some classes by visibility level. The classes are listed below in the order of viewing angle from the smallest.

(1) Discriminable visual field: High accuracy information perception range such as reading characters (within about 5 degrees in vertical and horizontal directions)

(2) Functional visual field: The range where information can be searched for by eye motions only (within about 10 degrees in vertical direction and about 15 degrees horizontal direction)

(3) Inducible visual field: The range where existence of information can barely be known, and the information therein influences one's sense of orientation (within about 40 degrees in vertical direction and about 50 degrees in horizontal direction)

The sense of image perception of a man will change when an image is rendered in each of visual field ranges. That is, the further the image rendering range extends from the functional visual field, the more feeling of presence one can get. Furthermore, if the image rendering range extends from the inducible visual field, the feeling of immersion can be obtained. Thus, the larger a perceived image occupying area becomes within the visual field of a man, the (virtual) feeling of reality impressed from the image will increase gradually.

Due to these reasons, large screen implementation technologies are useful to induce visual sense characteristics of a man. On the other hand, for rendering images with further reality, there still remains an issue on how to provide stereoscopic feeling with the images rendered on a planar screen. For example, with a so-called hold-on display type display device which is represented by a liquid crystal display providing a liquid crystal panel with light having uniform brightness on a screen, three-dimensional image rendering capability is not sufficient. This is because, for example, when two objects are to be displayed on a screen, they are rendered with the same brightness, irrespective of their distance or depth perception.

For example, in rendering an image of one white ball, the stereoscopic effects of a ball differ significantly when the ball image area is rendered with the same whiteness and brightness and when the ball image area is rendered with gradient applied uniformly from a certain point within the area. That is, in order to output an image with stereoscopic effect and perspective, a method to provide suitable distribution in brightness of the object to be recreated may be a solution, however, complexity of image signal processing has prevented the technology from being progressed.

As described above, representation of stereoscopic effect and feeling of presence is not sufficient with a conventional hold-on display type display device compared with a display device using a cathode-ray tube, as the brightness distribution is uniform over the whole screen. The range of an image a man gazes at is within the aforementioned functional visual field at best where information perception is enabled by eye motions, thus the central portion of the screen and in the vicinity thereof. If the brightness of the peripheral portion of the screen excluding the gazing point is equals to or higher than the brightness of the central portion which is the gazing point, a man is bothered by visually uncomfortable feeling, and becomes tired easily. That is, like a display device using cathode-ray tube, rendering of an image that does not cause uncomfortable feeling nor make a man tired will be enabled by increasing the brightness at the central portion and in the vicinity thereof relatively, compared with the brightness at the peripheral portion of a screen.

FIG. 27 shows an example of relative brightness distribution characteristics in horizontal direction of a screen in a display device having a cathode-ray tube. The length in horizontal direction is divided equally to 20, and the relative brightness distribution in horizontal direction is shown with the brightness at the center (the position with a scale of 11 in the figure) being scaled to 100. Generally, the brightness provided by a cathode-ray tube at both sides is in a range of 65 (relative brightness distribution characteristic 101 in the figure) to 85 (relative brightness distribution characteristic 102 in the figure), which is relatively low, compared with the brightness of 100 at the center. This is because the deflection center of an electron beam through a horizontal and vertical deflection circuit of a cathode-ray tube is located before the center of the curvature of a screen, and the distance from the deflection center of the cathode-ray tube is longer at the peripheral portion of the screen. According to the brightness distribution characteristics of a display device using this cathode-ray tube, however, the brightness at the central portion of the screen and in the vicinity thereof is relatively higher than the brightness of the peripheral portion of the screen, enabling to render images within the functional visual field, that are not uncomfortable for a man and that do not make a man easily get tired.

In the hold-on display type liquid crystal display device described above, a backlight unit is used as the unit to illuminate an object such as a liquid crystal display panel. In a liquid crystal display device, two types of structures have been adapted: direct type and edge light type (light guide plate type) backlight units.

The direct type backlight unit is a system arranging fluorescent tubes and/or LEDs (Light Emitting Diodes) that are the light sources disposed directly under the liquid crystal panel that is an object, and sufficient brightness can be obtained by increasing the number of light sources in accordance with the screen size of the display device. However, uneven brightness is easily caused between the portions where light sources are disposed and the other portions where light sources are not disposed. With a direct type backlight unit, strength of the backlight unit is required to be attained. Thus, for example, a structure having a backlight unit enclosure formed by a metal plate, a reflective sheet applied on the inner surface of the backlight, and a plurality of straight tube lamps arranged thereon has been employed.

The edge light type backlight unit, on the other hand, is a system where light sources such as fluorescent lamps are arranged at the edge portion of a light guiding body made from transparent acrylic plate or another, so that one single panel is formed as the surface light source by utilizing multiple reflection within the light guiding body. With an edge light type backlight unit, a reflector is disposed behind strip lamps or L-shaped lamps. The display device using the edge light type backlight unit can reduce the thickness, however, the mass of the light guiding body becomes excessively large with a large model, and the brightness on the screen becomes difficult to be attained as the screen gets larger.

Due to the characteristics described above, generally direct type backlight unit is used for a large screen liquid crystal display device, while an edge light type backlight unit is used for a small screen liquid crystal display device.

Among liquid crystal display device with backlight unit described above, a liquid crystal display device is disclosed, wherein the clearance between fluorescent tubes is smaller at the central portion of the screen, and is getting larger toward the edges (for example, see Patent Document 1), in order to achieve lower power consumption, compactness, thinness and lightness. The device is so designed as to decrease the number of backlight fluorescent tubes by reducing the brightness gradually from the center of a screen toward the edges, while brightness is maintained at a level a man cannot recognize the reduction of the brightness.

A backlight illuminating a liquid crystal panel is disclosed, wherein the brightness is maximum at a position above or below the center and is gradually reduced in the vertical direction (for example, see Patent Document 2). This is achieved by controlling the brightness distribution of the backlight through adjustment of a reflector or control of the open width of the color filter.

Yet another backlight unit is disclosed, wherein the uniformity of the surface light source brightness is maintained by setting the clearance between straight tube type lamps at the central portion of the display screen of a liquid crystal panel smaller, and wider toward the edges of the display screen, thereby achieving lower power consumption (for example, see Patent Document 3).

The backlight units disclosed in the above-mentioned Patent Documents 1 and 3 are designed to reduce power consumption by reducing the number of fluorescent lamps constituting a backlight while maintaining the uniformity of brightness on the display screen. The backlight unit disclosed in Patent Document 2 implements uniformity of display by correcting non-uniformity of brightness in vertical direction that is caused by angle-dependent visibility and heat created by the backlight by adjusting the brightness distribution in vertical direction of the screen of a liquid crystal panel.

Thus, the backlight units disclosed in above mentioned Patent Documents 1, 2 and 3 consequently provides brightness distribution on the display surface of a liquid crystal display device, however, this brightness distribution is formed only in the vertical direction of the display screen. However, the backlight units do not implement two-dimensional characteristics in accordance with visual sense characteristics of a man as provided by a display device using a cathode-ray tube, that is, brightness distribution characteristics with gradient being formed at least in the horizontal and vertical directions from the central portion of a screen. Therefore issues of visual uncomfortableness and fatigability for a man have not been improved yet.

The present invention is conceived considering the aforementioned situation, and is intended for providing, in accordance with visual sense characteristics of a man, a backlight unit that enables rendering of images that are not uncomfortable to a man and not easily fatigable by forming brightness gradient at least in the horizontal and vertical directions so that the brightness of the central portion of the screen and in the vicinity thereof is relatively higher than the brightness at the peripheral portion, which is provided by a display device with a cathode-ray tube, and also a liquid crystal display device using the backlight.

Patent Document 1: Japanese Laid-Open Patent Publication No. H06-75216

Patent Document 2: Japanese Laid-Open Patent Publication No. H11-119217

Patent Document 3: Japanese Laid-Open Patent Publication No. 2002-82626

DISCLOSURE OF THE INVENTION

A first technological means of the present invention for a backlight unit to illuminate an object to be illuminated using a light source is characterized in that the backlight unit has brightness gradient forming means for forming brightness gradient in the horizontal and vertical directions on the surface to be illuminated of the object to be illuminated.

A second technological means of the present invention is the backlight unit according to the first technological means, which is characterized in that the backlight unit has a reflection portion for causing a light from the light source to exit toward a certain direction, the brightness gradient forming means is disposed on the reflection portion, and the brightness gradient is formed in the horizontal and vertical directions on the surface to be illuminated of the object to be illuminated by controlling the reflectance at the reflection portion.

A third technological means of the present invention is the brightness gradient forming means according to the second technological means, wherein the brightness gradient forming means is characterized in that the reflection portion has a region where reflectance is relatively higher and another region where reflectance is relatively lower, and brightness gradient is formed in the horizontal and vertical directions on the surface to be illuminated of the object to be illuminated utilizing the reflectance differences.

A fourth technological means of the present invention is the brightness gradient forming means according to the third technological means, wherein the brightness gradient forming means is characterized in that the means has reflectance gradient formed by changing the reflectance on the reflection portion little by little or step by step; the reflectance gradient is arranged so that the brightness of the central portion is relatively higher than the brightness at the peripheral portion on the surface to be illuminated of the object to be illuminated.

A fifth technological means of the present invention is the brightness gradient forming means according to the fourth technological means, wherein the brightness gradient forming means is characterized in that the means is a dot pattern provided on the reflection portion, by which the reflectance of the reflection portion is controlled.

A sixth technological means of the present invention is a technological means according to the fifth technological means which is characterized in that the reflectance of the reflection portion having the dot pattern is controlled by any of the reflectance of each group of fine dots constituting the dot pattern, the density of dots, the shape of dots and/or color of dots, or any combination thereof.

A seventh technological means of the present invention is a technological means according to the fifth or sixth technological means, which is characterized in that the distribution of the fine dots constituting the dot pattern has a substantially elliptical shape.

An eighth technological means of the present invention is the technological means according to the first technological means which is characterized in that the backlight unit has a reflection portion for causing the light from the light source to exit in a certain direction, the reflection portion comprises at least a first and second reflection layers each having a predetermined light reflectance and transmittance, the brightness gradient forming means comprises the reflection portion having a first region with the first and second reflection layers being overlapped in the light incident direction and a second region having the first reflection layer only, and brightness gradient is formed in the horizontal and vertical directions on the surface to be illuminated of the object to be illuminated by controlling the reflectance of the reflection portion using the first region providing a relatively higher reflectance and the second region providing a lower reflectance than the first region.

A ninth technological means of the present invention is the technological means according to the first technological means which is characterized in that the backlight unit has a reflection portion for causing the light from the light source to exit in a certain direction, the reflection portion comprises at least a first and second reflection layers having a predetermined light reflectance and transmittance, the brightness gradient forming means comprises the reflection portion having a first region with the first and second reflection layers that are overlapped in the light incident direction at a position equivalent to the central portion in the horizontal direction of the surface to be illuminated and a second region with the first reflection layer only at both the edge portions, and brightness gradient is formed in the horizontal and vertical directions on the surface to be illuminated of the object to be illuminated by controlling the reflectance of the reflection portion in the horizontal direction of the surface to be illuminated using the first region providing relatively higher reflectance and the second region providing lower reflectance than the first region, and by setting the brightness of the light source located at a position equivalent to the central portion in the vertical direction of the surface to be illuminated relatively higher than the brightness of the light source located at both the edge portions.

A tenth technological means of the present invention is the technological means according to the first technological means which is characterized in that the backlight unit has a reflection portion for causing the light from the light source to exit in a certain direction, the reflection portion comprises at least a first and second reflection layers having a predetermined light reflectance and transmittance, the brightness gradient forming means comprises the reflection portion having a first region with the first and second reflection layers that are overlapped in the light incident direction at a position equivalent to the central portion in the vertical direction of the surface to be illuminated and a second region with the first reflection layer only at both the edge portions, and brightness gradient is formed in the horizontal and vertical directions on the surface to be illuminated of the object to be illuminated by controlling the reflectance of the reflection portion in the vertical direction of the surface to be illuminated using the first region providing relatively higher reflectance and the second region providing lower reflectance than the first region, and also by setting the brightness of the light source located at a position equivalent to the central portion in the horizontal direction of the surface to be illuminated relatively higher than the brightness of the light source located at both the edge portions.

An eleventh technological means of the present invention is the technological means according to the first technological means which is characterized in that the light source comprises a fluorescent lamp, the brightness gradient forming means is disposed in the glass tube of the fluorescent lamp to form brightness gradient in the horizontal and vertical directions of the surface to be illuminated of the object to be illuminated by controlling the transmittance of the glass tube.

A twelfth technological means of the present invention is the technological means according to the first technological means which is characterized in that the backlight unit has a diffusion portion that causes the light from the light source to diffuse, the brightness gradient forming means is disposed in the diffusion portion to form brightness gradient in the horizontal and vertical directions of the surface to be illuminated of the object to be illuminated by controlling the transmittance of the diffusion portion.

A thirteenth technological means of the present invention is the technological means according to the eleventh or twelfth technological means which is characterized in that the brightness gradient forming means has a region in the glass tube or the diffusion portion providing relatively higher transmittance and another region providing lower transmittance and the difference of which forms brightness gradient in the horizontal and vertical directions on the surface to be illuminated of the object to be illuminated.

A fourteenth technological means of the present invention is the technological means according to the thirteenth technological means which is characterized in that the brightness gradient forming means has transmittance gradient formed by changing the transmittance of the diffusion portion little by little or step by step, brightness at the central portion on the surface to be illuminated of the object to be illuminated is made relatively higher than the brightness at the peripheral portion according to the transmittance gradient.

A fifteenth technological means of the present invention is the technological means according to any of the eleventh to fourteenth technological means which is characterized in that the brightness gradient forming means is a dot pattern disposed in the glass tube or diffusion portion and that the transmittance is controlled by the dot pattern.

A sixteenth technological means of the present invention is the technological means according to the fifteenth technological means which is characterized in that the transmittance of the glass tube or diffusion portion provided with the dot pattern is controlled by any of the transmittance of fine dot groups constituting the dot pattern, dot density, dot shape, or dot color, or any combination thereof.

A seventeenth technological means of the present invention is the technological means according to the sixteenth technological means which is characterized in that the distribution form of fine dots constituting the dot pattern is substantially elliptical.

An eighteenth technological means of the present invention is the technological means according to the first technological means which is characterized in that the light source comprises a fluorescent lamp, the brightness gradient forming means is provided in a glass tube of the fluorescent lamp, and the brightness gradient is formed in the horizontal and vertical directions on the surface to be illuminated of the object to be illuminated by controlling the brightness on the tubular surface of the glass tube.

A nineteenth technological means of the present invention is the technological means according to the eighteenth technological means which is characterized in that the brightness gradient forming means optimizes the thickness of the fluorescent substance formed inside of the glass tube of the fluorescent lamp at the position equivalent to the central portion on the surface to be illuminated of the object to be illuminated, and that the brightness of the tubular surface of the glass tube is controlled by increasing or decreasing the thickness at positions equivalent to the peripheral portion on the surface to be illuminated of the object to be illuminated from the optimized thickness.

A twentieth technological means of the present invention is the technological means according to the first technological means which is characterized in that the light source comprises LEDs, the LEDs are disposed with a substantially uniform density in each of the regions formed on the substrate of the backlight unit, the brightness gradient forming means forms brightness gradient in the horizontal and vertical directions on the surface to be illuminated of the object to be illuminated by controlling the radiation brightness or radiation wavelength of the LEDs.

A twenty-first technological means of the present invention is the technological means according to the twentieth technological means which is characterized in that the brightness of the LEDs differs among regions that are concentrically formed around the central portion of the substrate of the backlight unit and in the vicinity thereof.

A twenty-second technological means of the present invention is the technological means according to the first technological means which is characterized in that the light source comprises LEDs, the LEDs have substantially same brightness, and the brightness gradient forming means forms brightness gradient in the horizontal and vertical directions on the surface to be illuminated of the object to be illuminated by controlling the surface density of the LEDs in each of regions formed on the substrate of the backlight unit.

A twenty-third technological means of the present invention is the technological means according to the twenty-second technological means which is characterized in that the surface density of the LEDs differ among regions concentrically formed around the center of the substrate of the backlight unit and in the vicinity thereof.

A twenty-fourth technological means of the present invention is a liquid crystal display device which is characterized in that the device has the backlight unit implemented by any of the first through twenty-third technological means and a liquid crystal panel to be illuminated by the backlight unit.

A twenty-fifth technological means of the present invention is characterized in that a liquid crystal display device which carries out image rendering by radiating the illumination light on a liquid crystal panel has brightness gradient forming means to form brightness gradient in the horizontal and vertical directions on the display screen of the liquid crystal panel.

A twenty-sixth technological means of the present invention is the technological means according to the twenty-fifth technological means which is characterized in that the brightness gradient forming means has a gradation conversion portion which carries out predetermined gradation conversion processes for input image data and a control portion which controls gradation conversion characteristics in the gradation conversion portion by switching depending on the input image data, and that the control portion switches the gradation conversion characteristics for the gradation conversion portion depending on the position of the image data in the display screen, thereby forming brightness gradient in the horizontal and vertical directions on the display screen of the liquid crystal panel.

A twenty-seventh technological means of the present invention is the technological means according to the twenty-fifth technological means which is characterized in that the liquid crystal panel of the brightness gradient forming means is structured to have an aperture ratio that is determined in accordance with the position in a display screen, and that brightness gradient is formed in the horizontal and vertical directions on the display screen of the liquid crystal panel by changing the aperture ratio.

A twenty-eighth technological means of the present invention is the technological means according to any of the twenty-fifth to twenty-seventh technological means which is characterized in that the display screen of the liquid crystal panel has an aspect ratio of 16:9.

BRIEF DESCRIPTION OF THE DRAWINGS

FIG. 11 is a drawing showing another embodiment of the backlight unit of the present invention.

FIGS. 12A to 12C are the enlarged views of the dot pattern printed on the glass tube shown in FIG. 11.

FIGS. 16A to 16D are drawings showing another embodiment of the backlight unit of the present invention.

PREFERRED EMBODIMENT OF THE INVENTION

Figure 1A:
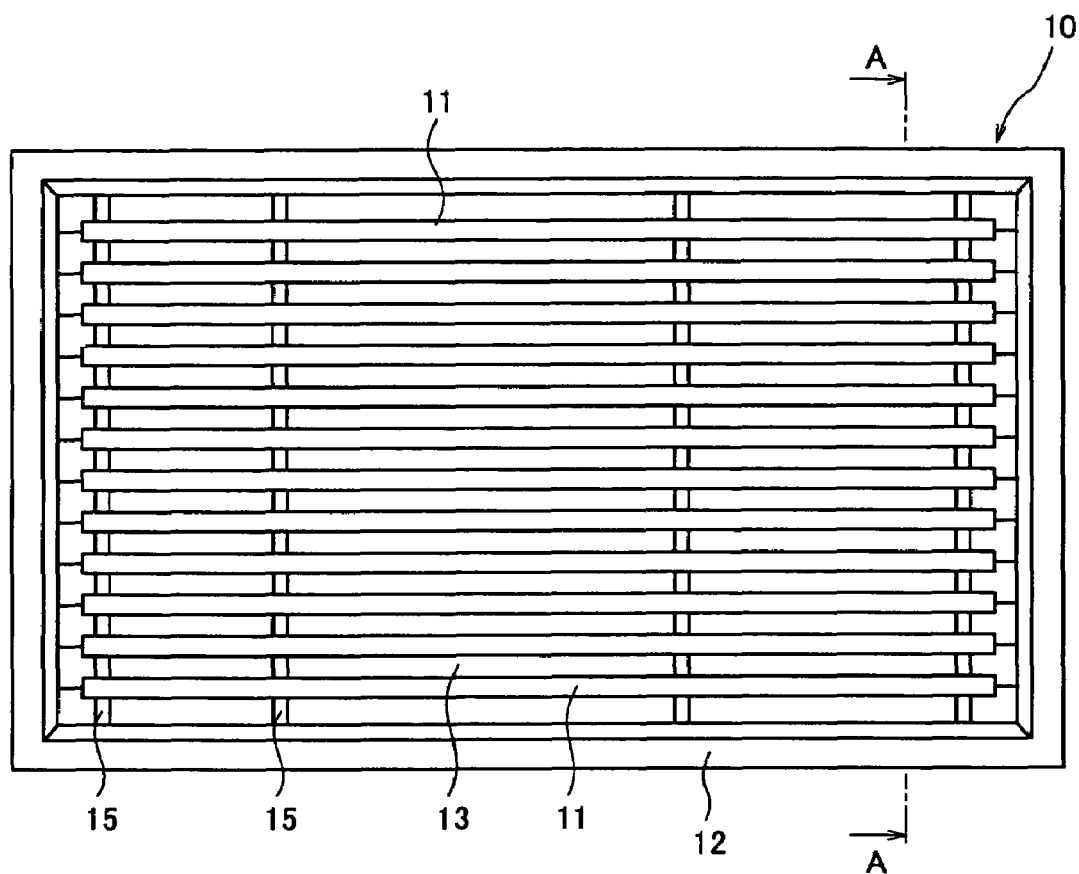
FIGS. 1A and 1B are drawings showing an embodiment of the direct-lighting backlight unit of the present invention.

As described above, a conventional backlight unit and liquid crystal display device have an issue that a man feels uncomfortable and gets easily tired if the brightness at the peripheral portion of a display screen is equivalent to or higher than the brightness at the central part of the screen which is the point to gaze at. The present invention provides a backlight unit or liquid crystal display device with a brightness gradient forming means to form brightness gradient at least in the horizontal and vertical directions so that the brightness at the central portion and in the vicinity thereof is relatively higher than the brightness at the peripheral portion of the screen of the liquid crystal panel which is illuminated by a light source comprising fluorescent lamps constituting a backlight, LED (Light Emitting Diodes) or another elements.

The horizontal and vertical directions in this specification mean the two directions perpendicular to the optical axis of the light source on the screen (the surface to be illuminated) of a liquid crystal panel.

The brightness gradient forming means to be provided for the backlight unit forms brightness gradient at least in the horizontal and vertical directions so that the brightness at the central portion of the screen and in the vicinity thereof is relatively higher than the brightness at the peripheral portion of the screen, just like a display device using a cathode-ray tube, by:

(1) providing reflecting means for directing the light from a light source to a single direction by reflecting the light with the means to form reflectance gradient at least in the horizontal and vertical directions, (2) providing means to form transmittance gradient from the central portion to the both ends in the longitudinal direction on the inner surface of the glass tube of a fluorescent lamp if the light source is a fluorescent lamp, (3) providing means to form brightness gradient in tubular surface brightness from the central portion to the both ends in the longitudinal direction on the inner surface of the glass tube of a fluorescent lamp if the light source is a fluorescent lamp, (4) providing means to form transmittance gradient at least in the horizontal and vertical directions for a diffusion sheet, and (5) providing means to control the radiation brightness (or radiation wavelength) of each point light source or the surface density if the light source is a point light source such as LEDs, for example. Also, brightness gradient may be formed by combining any of these means.

The brightness gradient forming means to be provided with a liquid crystal display device forms brightness gradient at least in the horizontal and vertical directions so that the brightness at the central portion of the screen and in the vicinity thereof is relatively higher than the brightness at the peripheral portion of the screen, just like a display device using a cathode-ray tube, by:

(1) controlling gradation conversion characteristics of image data to be supplied to a liquid crystal panel, and (2) controlling aperture ratio of a liquid crystal panel.

Referring to the appended drawings, preferred embodiments for embodying aforementioned brightness gradient forming means of the present invention are described below now. In the figures, like reference numerals refer to like function throughout all the drawings showing embodiments and are not explained repeatedly.

Embodiment 1

In this embodiment, brightness gradient forming means to form brightness gradient at least in the horizontal and vertical directions on the display screen (the liquid crystal panel) is provided for a reflection layer disposed in a backlight unit, so that the brightness at the central portion of the screen and in the vicinity thereof is relatively higher than the brightness at the peripheral portion of the screen, just like a display device using a cathode-ray tube. This brightness gradient forming means in this embodiment is provided for the purpose of controlling reflectance of the light from a light source.

Figure 1B:
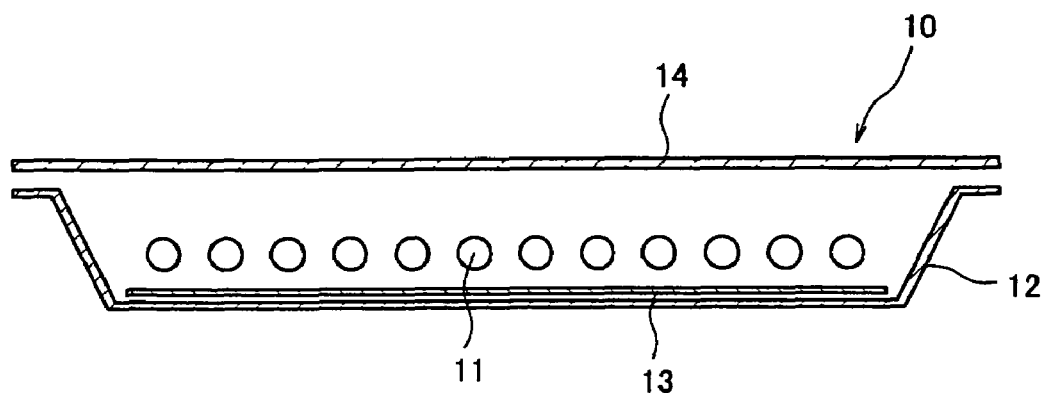

FIGS. 1A and 1B are the drawings for explaining an embodiment of a direct-lighting backlight unit of the present invention. A schematic plan view showing the internal structure of the backlight unit is shown in FIG. 1A while a schematic structural view of the backlight unit, illustrating cross-section A—A of FIG. 1A is shown in FIG. 1B. In FIGS. 1A and 1B, reference numeral 10 denotes a backlight unit, 11 denotes a fluorescent lamp, 12 denotes an enclosure, 13 denotes a reflection layer disposed at the bottom of the enclosure, 14 denotes a diffusion unit, and 15 denotes a lamp supporting member. FIG. 1A shows the internal structure of the unit, the diffusion unit 14 of which shown in FIG. 1B has been removed.

A backlight unit 10 has a reflection unit to direct the light from the fluorescent lamps 11 toward a certain direction. In this embodiment, a reflection layer 13 is provided on the inner surface of the bottom of an enclosure 12 of the backlight unit 10. This enclosure 12 may be structured by shield plates for shielding electromagnetic waves to be generated from fluorescent lamps 11.

The reflection layer 13 is retained with a gap against the inner surface of the bottom being maintained, or retained by being directly disposed on the inner surface of the bottom, and the reflection layer 13 may be, for example, a foamed PET (Polyethylene Terephthalate) sheet or materials having a light reflection surface such as silver, aluminum, or another material. As a foamed PET sheet, for example, E60L or E60V type Lumirror (R) supplied by Toray Co., Ltd. may be preferably used.

Generally, a foamed PET sheet is often used for a direct type reflection unit. A foamed PET reflection sheet is made by foaming PET to create fine air bubbles within the sheet, the light that entered in a formed PET sheet is refracted and regressed by air bubbles, will exit to the incident side, again.

The refraction characteristic between such PET materials and air in air bubbles causes light to be reflected, reducing loss of light, thereby a reflection unit with high reflectance using inexpensive members is obtained.

The diffusion unit 14 disposed at the front (surface) of the fluorescent lamps 11 comprises a material such as acrylic plate having light diffusing property, diffusing the light directly entered into or re-directed to the front side after being reflected by the reflection layer 13. Further, a functional film or sheet such as reflective polarizing film, prism sheet or ITO sheet may be included between the diffusion unit 14 and a liquid crystal panel (now shown in the figures) when installed in a liquid crystal display device.

Figure 2:
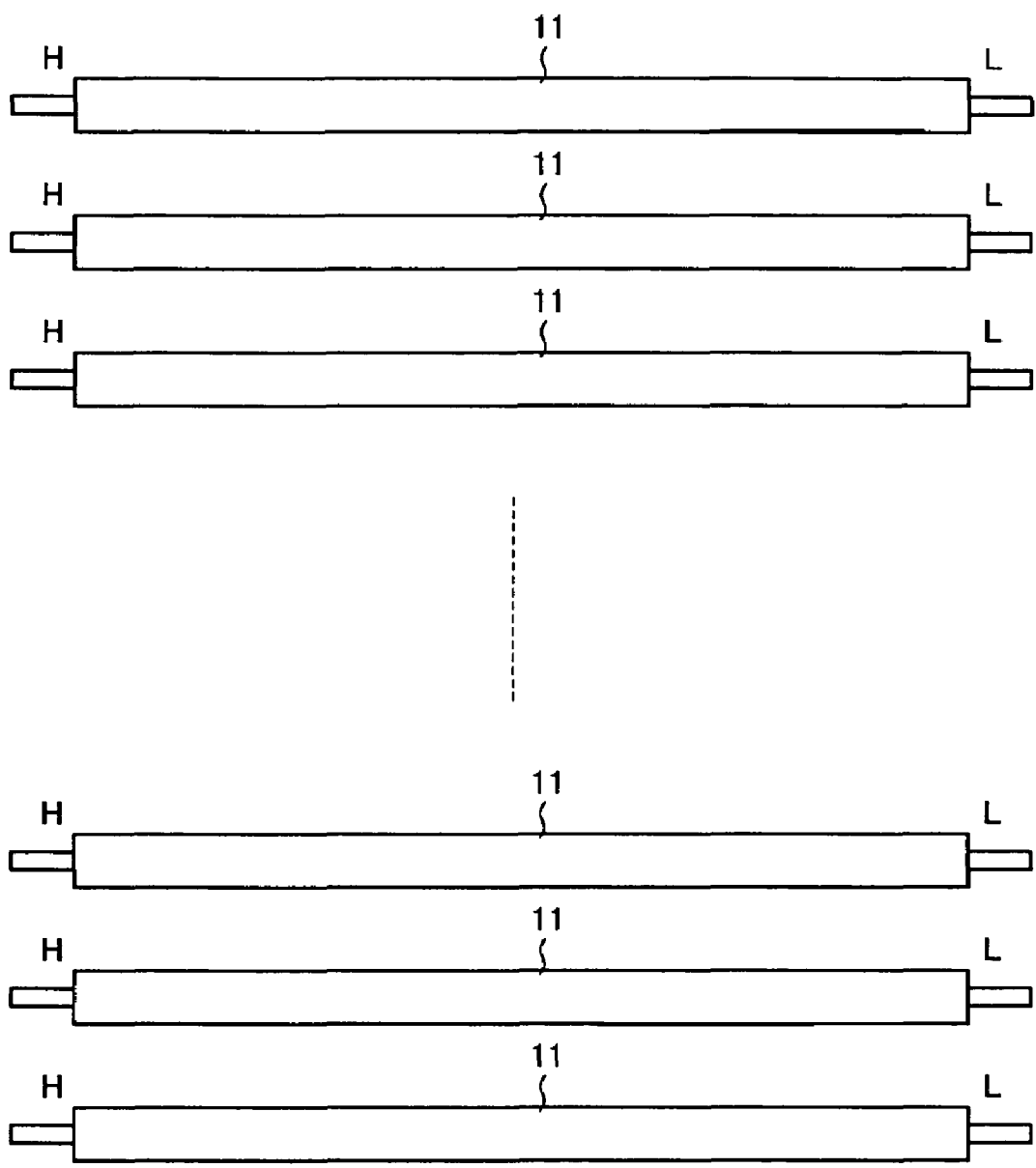
FIG. 2 is a drawing showing an arrangement example of fluorescent lamps in the backlight unit used in the present invention.

The light transmitted through the diffusion unit 14 illuminates the object to be illuminated (not shown in the figures), such as a liquid crystal panel to be disposed at the front surface side. In turning on a plurality of fluorescent lamps 11, high voltage is applied to the fluorescent lamps 11 by an inverter power supply circuit (not shown in the figures) FIG. 2 is a drawing for explaining an arrangement of fluorescent lamps 11 in the backlight unit applicable to the present invention, showing a plan layout of fluorescent lamps schematically. In this figure, a plurality of fluorescent lamps 11 are arranged parallel in the longitudinal direction. The fluorescent lamps 11 are arranged so that the high voltage side H and the low voltage side L of each of fluorescent lamps 11 are aligned to the respective sides, that is, the high voltage side H of a fluorescent lamp 11 is positioned in adjacent to the high voltage side of another fluorescent lamp 11, while the low voltage side L is positioned in adjacent to the low voltage side of another fluorescent lamps 11.

In this embodiment, brightness gradient forming means is provided for the reflection layer 13 in order to form brightness gradient at least in the horizontal and vertical directions of the object to be illuminated such as a liquid crystal panel (hereinafter represented by a liquid crystal panel).

Means to reduce reflectance from the central portion toward the peripheral portion of the reflection layer 13, or means to increase reflectance from the peripheral portion of the reflection layer 13 toward the central portion can be used as the brightness gradient forming means. As an example of this brightness gradient forming means, a dot pattern for controlling reflectance of the reflection layer 13 is provided, and brightness gradient is formed at least in the horizontal and vertical directions of the liquid crystal panel by controlling the reflectance of the light that is exited from fluorescent lamps 11 by the dot pattern.

Figure 3:
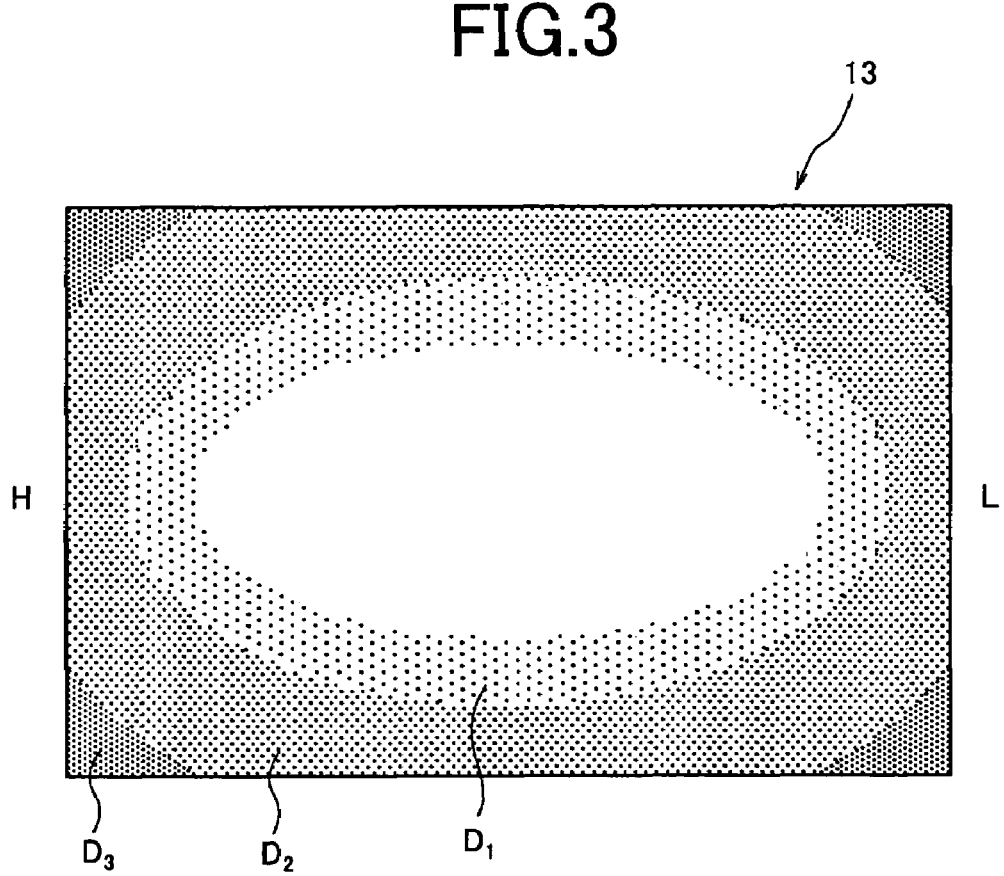
FIG. 3 is a drawing showing an example of dot pattern applied to a reflection layer.
Figure 4A:
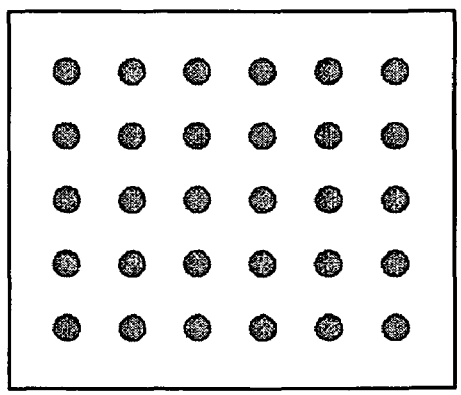
FIGS. 4A and 4B are drawings showing enlarged views of the dot pattern of the reflection layers shown in FIG. 3.
Figure 4B:
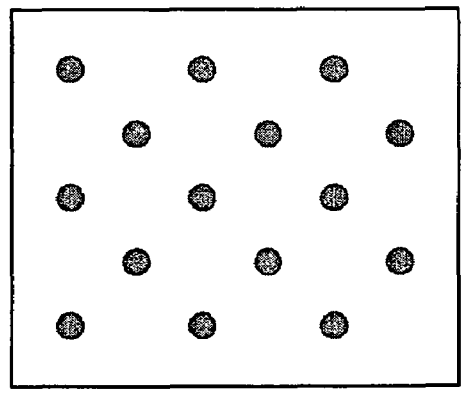

FIG. 3 is a drawing showing an example of dot pattern applied to the reflection layer 13. FIGS. 4A and 4B are the drawings showing the enlarged views of the dot pattern of the reflection layer 13 shown in FIG. 3, wherein FIG. 4A shows an enlarged region D3 shown in FIG. 3 while FIG. 4B shows enlarged region D1 shown in FIG. 3.

In this embodiment, the dot pattern applied to the reflection layer 13 has an effect to reduce the reflectance of the reflection layer 13, thus the reflectance of a material forming the dot pattern is relatively lower than the reflectance of the surface of the reflection layer.

Figure 27:
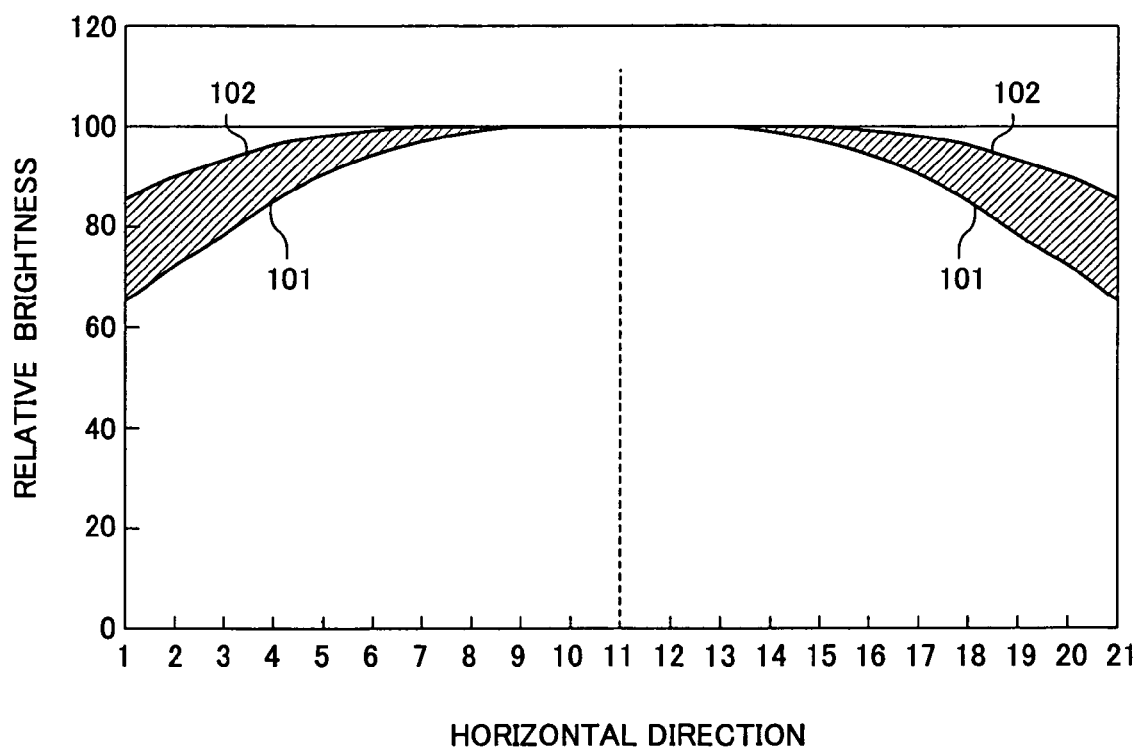
FIG. 27 is a drawing showing an example of relative brightness distribution characteristics in the horizontal direction of the screen of a display device having a cathode-ray tube.

In this embodiment, as shown in FIG. 3, the reflection layer 13 has regions D1, D2 and D3 in which the reflectance becomes smaller step by step from the central portion toward the peripheral portion. These regions D1, D2 and D3 are formed to be substantially elliptical shape, having a major axis in the horizontal direction (right to left) and a minor axis in the vertical direction (top to bottom). In this embodiment, the dot pattern corresponding to the relative brightness distribution of a cathode-ray tube (relative brightness distribution characteristics 101) shown in FIG. 27 is applied to the reflection layer 13. By forming the aforementioned substantially elliptical shape, the visual sense characteristics of a man, that is, visual field range becomes narrower in vertical direction (top to bottom) and wider in horizontal direction (right to left) can be satisfied.

In this embodiment, the dot pattern applied to the reflection layer 13 has regions D1, D2 and D3 from the central portion toward the peripheral portion with their dot densities become larger step by step, in order to reduce reflectance from the central portion to the peripheral portion. For example, as shown in FIGS. 4A and 4B, dots in the dot pattern have the same size, and dot density of the screen of the side closer to the periphery is set to higher. Thus the brightness gradient at the central portion of the screen of a liquid crystal panel and in the vicinity thereof is relatively higher than the brightness gradient at the peripheral portion of the screen, just like a display device having a cathode-ray tube, can be achieved by changing the reflectance on the reflection layer 13 step by step from the central portion toward the peripheral portion.

When a dot pattern is used to control reflectance of a reflection unit, as the example described above, the reflectance of the reflection layer 13 can be controlled by applying a dot pattern providing lower reflectance compared with the reflection surface of the reflection layer 13, however on the contrary, the reflectance of the reflection layer 13 may be controlled by applying a dot pattern providing higher reflectance compared with the reflection surface of the reflection layer 13. In this case, a dot pattern providing reflectance that becomes relatively higher from the peripheral portion toward the central portion is applied to the reflection layer 13. For example, if a foamed PET sheet is used for the reflection layer 13, by applying a dot pattern formed by a high reflectance material such as silver or aluminum to the region equivalent to the central portion of the reflection layer 13, a relatively higher brightness gradient at the central portion of the screen of a liquid crystal panel and in the vicinity thereof than the brightness gradient at the peripheral portion of the screen of the liquid crystal panel can be achieved, just like a display device using a cathode-ray tube.

The dot pattern for controlling reflectance, as exemplified in FIGS. 3, 4A and 4B, may control reflectance by changing densities of the dots with the same shape as well as by changing the dot shapes (size), and may further combine dot shapes and densities. Further, as reflectance is changed by changing the color of a dot, reflectance may be controlled by combining shape, density and color of a dot. For example, the shape of each dot in a dot pattern may be a circular, triangular, polygonal, star-shaped, elliptical, and the color of a dot may be gray, dark brown, silver, green, black, white, purple, or another color.

The dot pattern as described above does not change reflectance step by step as exemplified in FIG. 3, but may be applied with the gradient slightly reducing reflectance from the central portion toward the peripheral portion (or slightly increasing reflectance from the peripheral portion toward the central portion). Such reflectance gradient can be achieved by changing either of the shape, size, density, or color, or combination thereof.

The dot pattern to be applied to the reflection layer 13 can be formed by applying ink on the reflection layer 13 by printing such as screen printing or inkjet printing. Besides printing, sputtering or vapor deposition, photolithography or optical machining using a laser beam, or lamination of transparent film with a dot pattern may be used to form a dot pattern.

Another practical example of brightness gradient forming means is to apply an ink or dyestuff whose concentration can be changed in order to control the reflectance of the reflection unit step by step or to control the reflectance of the reflection unit so that the reflectance of the reflection unit increases or decreases gradually. The change in concentration may be achieved by changing the concentration of the dyestuff or pigment itself, or the apparent concentration may be changed by changing the thickness of a film on which the dyestuff or pigment is applied.

As brightness gradient forming means, a plurality of materials with different reflectances may be applied on the surface of the reflection layer 13 to change reflectance step by step. Further, roughness of the surface of the reflection layer 13 may be changed to control reflectance based on differences in the optical diffusion characteristic or the optical absorption characteristic on the surface.

Yet in order to control reflectance of the reflection layer 13, means to reduce reflectance of the reflection layer 13 relatively and means to increase reflectance relatively may be combined together.

Embodiment 2

Figure 5:
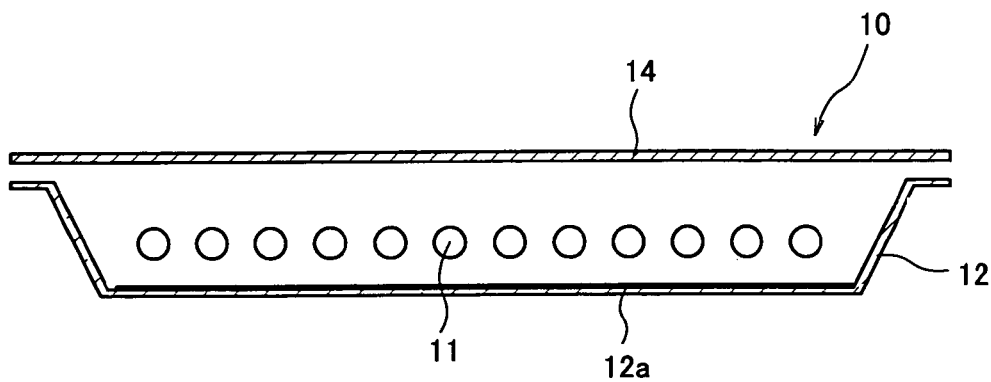
FIG. 5 is a drawing showing another embodiment of the backlight unit of the present invention.

FIG. 5 is a drawing showing another embodiment of the backlight unit of the present invention, which is a cross-sectional schematic view equivalent to section A—A of the backlight unit shown in FIG. 1A. As a reflection unit, the backlight unit of this embodiment has a reflection surface 12a, instead of a reflection layer 13 of aforementioned Embodiment 1, to reflect the light from fluorescent lamps 11 toward a diffusion unit 14. The reflection surface 12a is formed by a reflecting film made of a high reflectance material such as silver or aluminum formed on the inner surface of the bottom of the enclosure 12. As shown in FIG. 2, fluorescent lamps 11 are arranged so that high voltage side H and low voltage side L of each of the fluorescent lamps are aligned respectively to the same sides.

Figure 6:
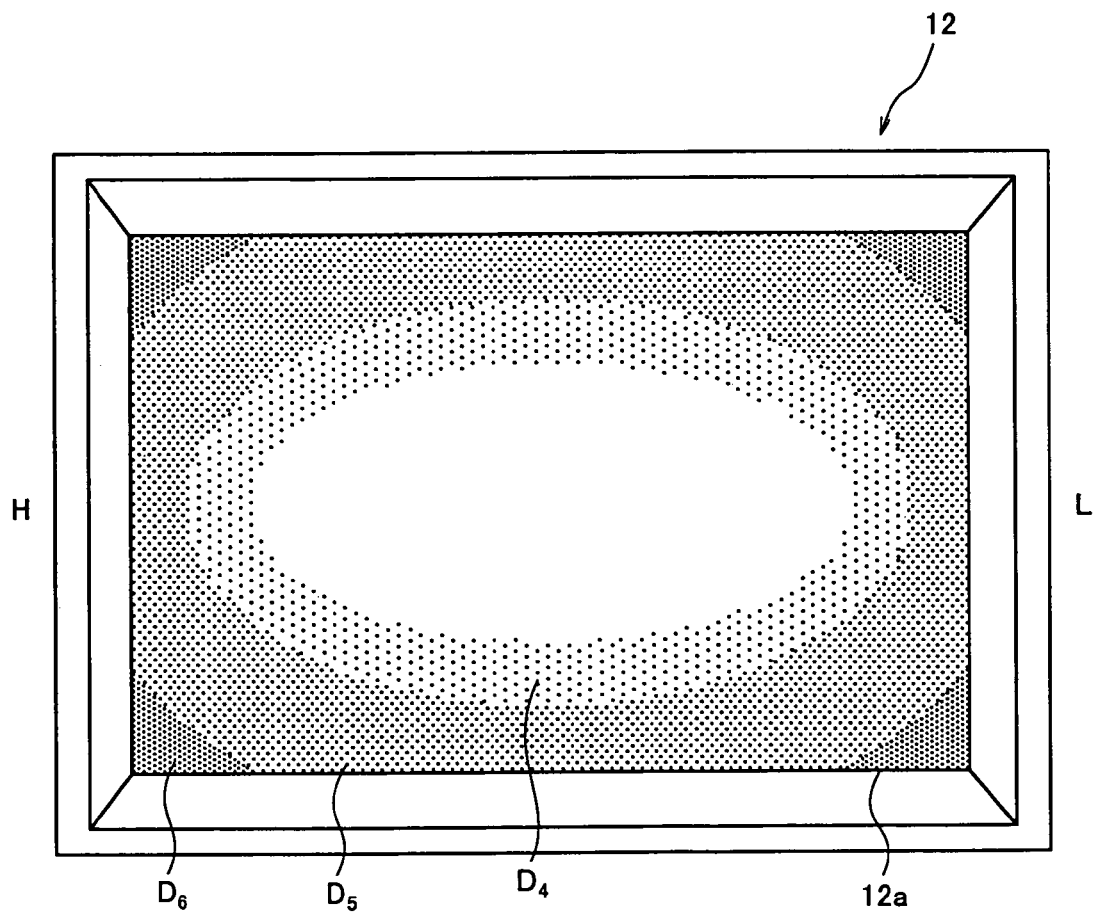
FIG. 6 is a drawing showing an example of dot pattern applied to a reflection surface.

In this embodiment, the brightness gradient forming means for controlling light reflectance as described in Embodiment 1 above is disposed on the reflection surface 12a. FIG. 6 is a drawing for explaining an example of a dot pattern applied to the reflection surface 12a. In this embodiment, the dot pattern applied to the reflection surface 12a has an effect to reduce the reflectance of the reflection surface 12a, regions D4, D5 and D6 are provided on the reflection surface 12a, and the reflectance of which becomes smaller step by step from the central portion toward the peripheral portion. These regions D4, D5 and D6 are formed to be substantially elliptical shapes, having a major axis in the horizontal direction (right to left) and a minor axis in the vertical direction (top to bottom). In this embodiment, the dot pattern corresponding to the relative brightness distribution of a cathode-ray tube (relative brightness distribution characteristics 101) shown in FIG. 27 is applied to the reflection surface 12a. This enables the brightness at the central portion of a liquid crystal panel screen and in the vicinity thereof to be relatively higher than the brightness at the peripheral portion of the screen, just like a display device using a cathode-ray tube by changing reflectance of the reflection surface 12a step by step from the central portion toward the peripheral portion. Specific configuration of the brightness gradient forming means is not described again here, as the brightness gradient forming means of Embodiment 1 can be applied.

Embodiment 3

Figure 7:
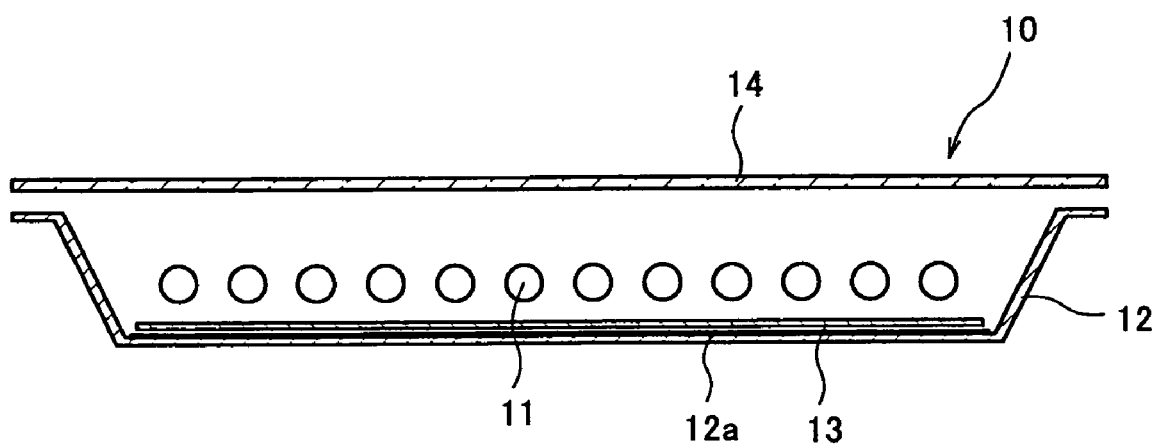
FIG. 7 is a drawing showing another structural example of the backlight unit of the present invention.

FIG. 7 is a drawing for explaining another structural example of the backlight unit of the present invention, showing a schematic cross-sectional view equivalent to section A—A of the backlight unit shown in FIG. 1A. As a reflection unit, the backlight unit of this embodiment has a reflection layer 13 shown in the structure in FIGS. 1A and 1B and a reflection surface 12a shown in FIG. 5. As shown in FIG. 2, fluorescent lamps 11 are arranged so that high voltage side H and low voltage side L of each of the fluorescent lamps are aligned respectively to the same sides.

As described in Embodiment 1. a reflection layer 13 is disposed on an enclosure 12 of a backlight unit 10. For the reflection layer 13, for example, aforementioned foamed PET sheet is used, providing a reflection function to reflect the light from fluorescent lamps 11, however part of the light transmits the reflection layer 13 and exits to the rear side thereof. On the inner surface of the bottom of the backlight unit 10, a reflection surface 12a, as described in the above Embodiment 2, is provided, which reflects the light that has transmitted the reflection layer 13 back to the direction of the reflection layer 13. The light reflected by the reflection surface 12a is again separated into reflected light and transmitted light on the reflection layer 13. The transmitted light is directed toward a diffusion unit 14 to be efficiently utilized.

The reflection layer 13 is supported by a frame-shaped support such as a frame or lamp holder, or a supporting member such as screws or stays. The reflection layer 13 does not contact closely with the reflection surface 12a, but air space is provided between the reflection layer 13 and the reflection surface 12a. In order to provide air space, a certain clearance may be provided between the reflection layer 13 and the reflection surface 12a, or the reflection layer 13 may simply be placed and supported on the reflection surface 12a. That is, the presence of thin film air space on the surface of the rear side of the reflection layer 13 makes the refractive index difference between the reflection layer 13 and the air larger on the surface of the rear side of the reflection layer 13, improving the reflectance of the reflection layer 13. For example, if a material such as adhesive having a refractive index close to that of the reflection layer 13 is disposed on the rear surface of the reflection layer 13, the segment of light that transmits the reflection layer 13 is increased, affecting the light reflection characteristics.

In this embodiment, by providing the brightness gradient forming means of the embodiments described above for the reflection layer 13, relatively higher brightness can be obtained at the central portion of a liquid crystal panel screen and in the vicinity thereof than the brightness at the peripheral portion of the screen, just like a display device using a cathode-ray tube, however, the brightness gradient forming means described above may further be applied to both of the reflection layer 13 and the reflection surface 12a, or to the reflection surface 12a only. As the brightness gradient forming means applied to the reflection surface 12s contributes only to the light transmitted the reflection layer 13, it is required to design a reflectance distribution based on the reflectance of the reflection layer 13 (i.e. transmittance)

Embodiment 4

Figure 8A:
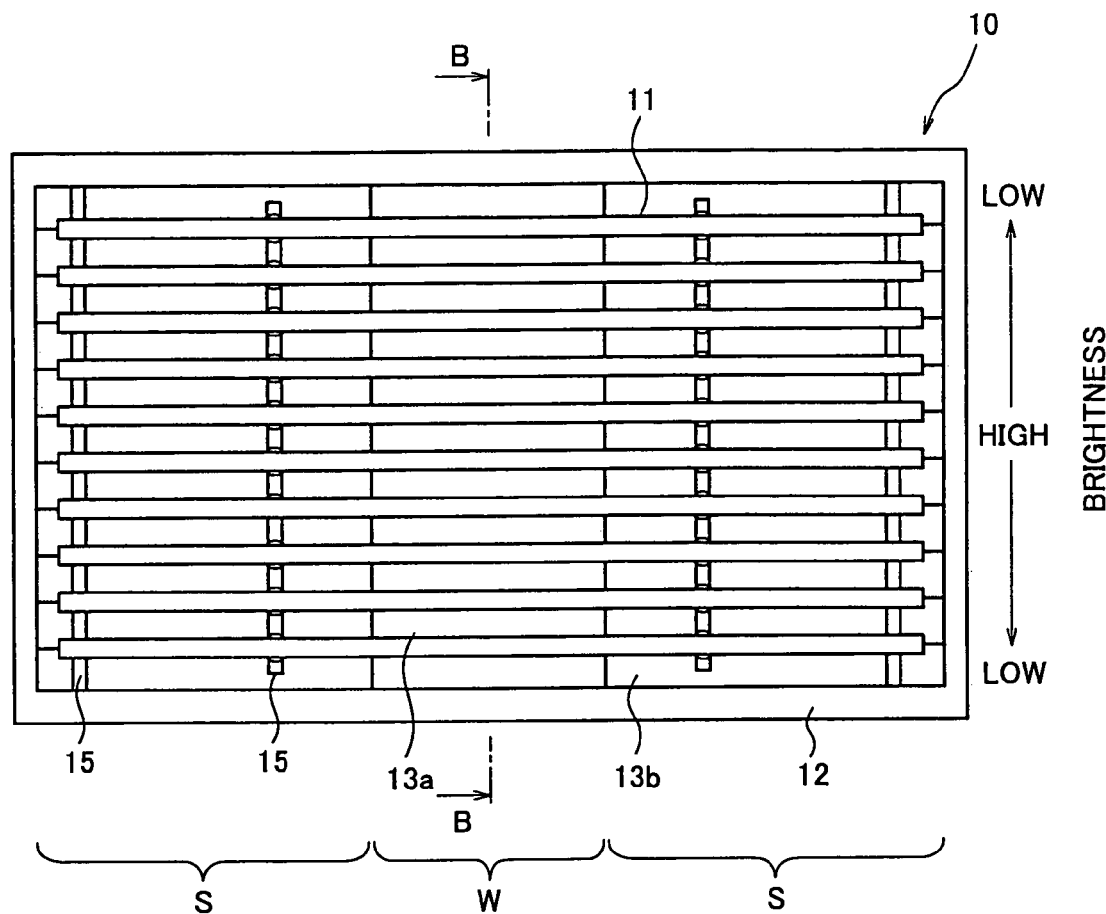
FIGS. 8A and 8B are drawings showing still another embodiment of the backlight unit of the present invention.
Figure 8B:
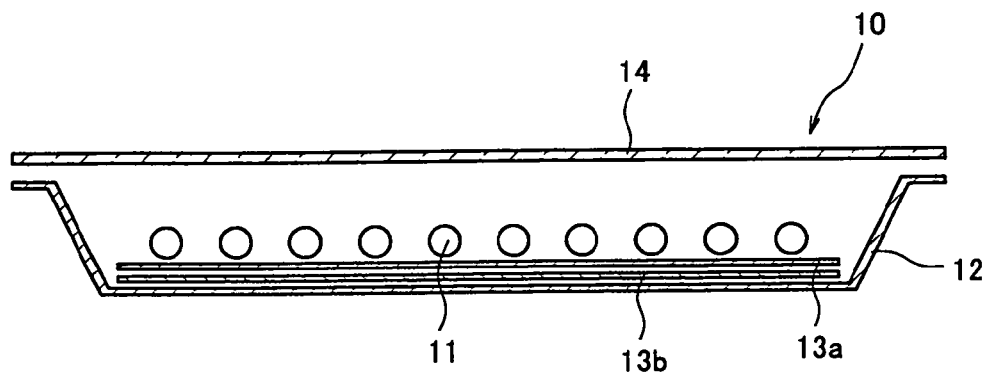

FIGS. 8A and 8B are drawings showing still another embodiment of the backlight unit of the present invention. FIG. 8A is a schematic plane view showing the inside of the backlight unit, while FIG. 8B is a schematic structural view of the backlight unit at cross-section B—B shown in FIG. 8A. In FIGS. 8A and 8B, a backlight unit 10 has reflection layers 13*a* and 13*b*. FIG. 8A shows the internal structure of the unit from which a diffusion unit 14 has been removed.

The backlight unit 10 has a reflection unit which directs the light from the fluorescent lamps 11 to a certain direction, and in this embodiment, as the reflection unit, two reflection layers 13*a* and 13*b* are disposed on the inner surface of the bottom of an enclosure 12 of the backlight unit 10. Each of the reflection layers 13*a* and 13*b* has a property like a foamed PET sheet as described above, reflects light in a high reflectance, however, a part of the incident light transmits to the rear side. In this embodiment, a region W where the reflection layers 13*a* and 13*b* are overlapped in the vertical direction (light incident direction), and a region S where only the reflection layer 13*b* is provided, are set up.

As described above, the reflection layers 13*a* and 13*b* let a part of incident light transmit to the rear side. In the region W where two reflection layers 13*a* and 13*b* are overlapped, the light transmitted the first reflection layer 13*a* disposed on the front side (fluorescent lamps 11 side) is reflected by the second reflection layer 13*b* on the rear side, and returned to the first reflection layer 13*a* side. Then the light transmitted the reflection layer 13*a* directs toward the diffusion unit 14 to be efficiently utilized.

On the other hand, in the region S where only the second reflection layer 13*b* exists, the light reflected by the reflection layer 13*b* is efficiently utilized, but the light transmitted the reflection layer 13*b* dissipates at the rear side thereof. During this, even if the transmitted light is reflected by the inner surface of an enclosure 12 and returned to the reflection layer 13*b*, the effective utilization ratio is low. Therefore, when the regions W and S are compared, the region W having two reflection layers 13*a* and 13*b* overlapped each other provides a relatively higher reflectance than the region S having one reflection layer 13*b* only.

With the structure shown in FIGS. 8A and 8B, the regions W and S are set up so that the area of the second reflection layer 13*a* on the rear side is larger than the area of the first reflection layer 13*b* on the front side, however, the area of the first reflection layer 13*a* may be set larger.

Using the reflection layers 13*a* and 13*b* for a two-layer structure described above, the reflectance at the central portion can be made relatively higher than that of the peripheral portion to achieve brightness gradient in the horizontal direction of a screen by locating the region W having the two reflection layers 13*a* and 13*b* at the region equivalent to the central portion of the screen in the horizontal direction, while the region S having the reflection layer 13*b* only at the region equivalent to the peripheral portion of the screen in the horizontal direction. In this embodiment, brightness gradient in the vertical direction of the screen is achieved by increasing the brightness of fluorescent lamps 11 at the positions equivalent to the central portion in the vertical direction of the screen (by setting the driving voltage higher), and by decreasing the brightness of the fluorescent lamps 11 at the positions equivalent to the peripheral portion (the upper and lower ends shown in FIG. 8A). By arranging so, relatively higher brightness can be obtained at the central portion of a liquid crystal panel screen and in the vicinity thereof than the brightness at the peripheral portion of the screen, just like a display device using a cathode-ray tube.

Embodiment 5

Figure 9A:
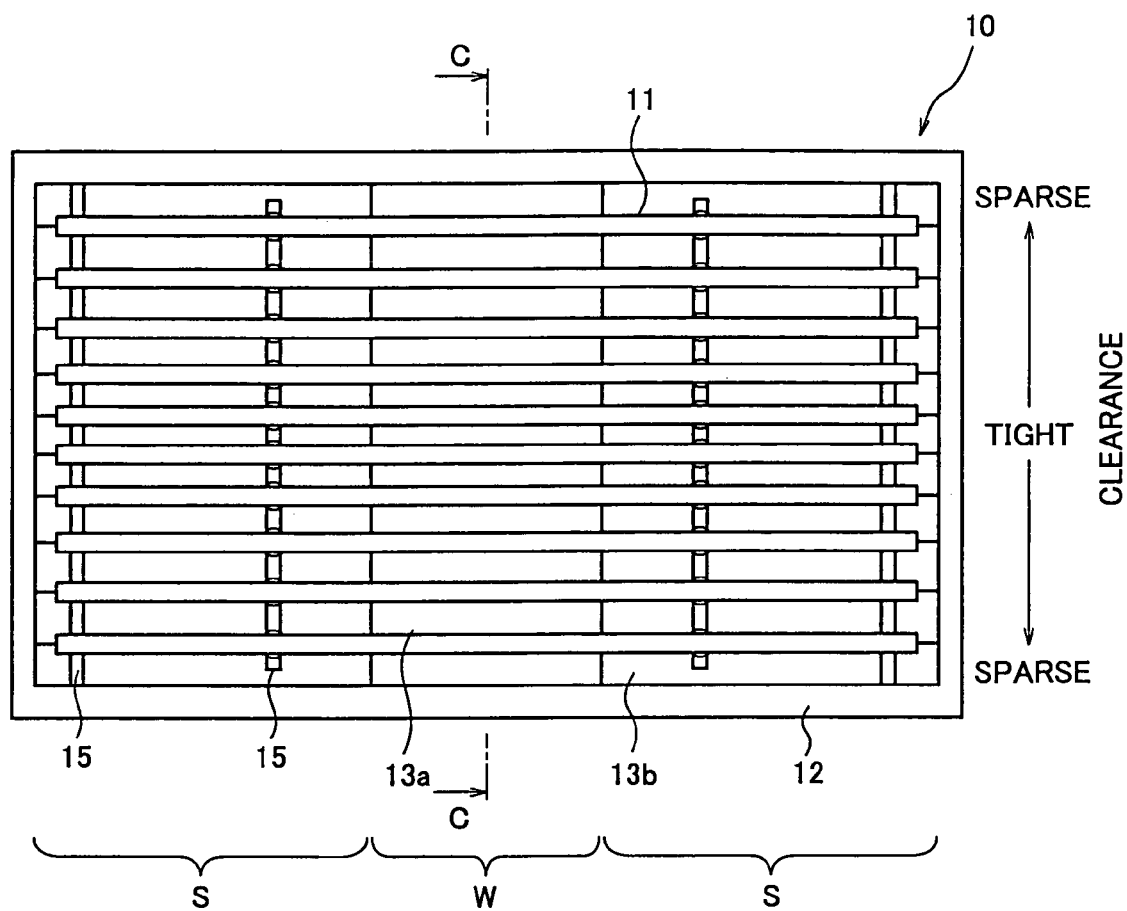
FIGS. 9A and 9B are drawings showing yet another embodiment of the backlight unit of the present invention.
Figure 9B:
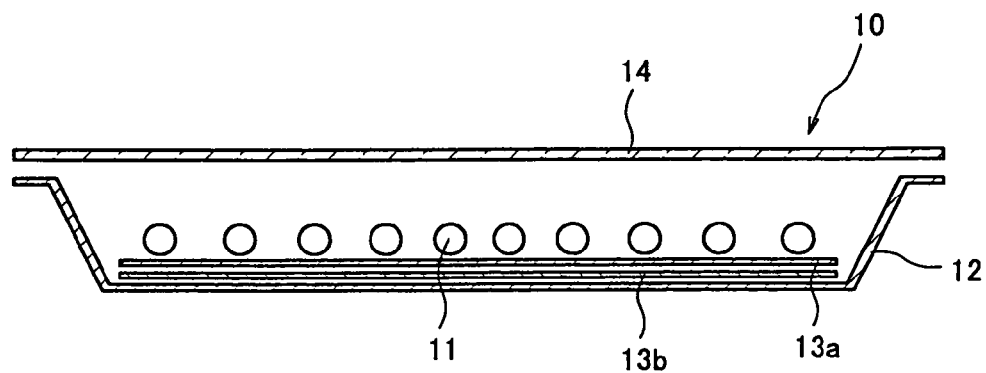

FIGS. 9A and 9B are drawings for explaining yet another embodiment of the backlight unit of the present invention. FIG. 9A is a schematic plane view showing the inside of the backlight unit, while FIG. 9B is a schematic structural view of the backlight unit at cross-section C—C shown in FIG. 9A. In FIGS. 9A and 9B, a backlight unit 10 has reflection layers 13*a* and 13*b*. FIG. 9A shows the internal structure of the unit from which a diffusion unit 14 has been removed.

The backlight unit 10 has a reflection unit which directs the light from the fluorescent lamps 11 to a certain direction, and in this embodiment, as the reflection unit, two reflection layers 13*a* and 13*b* are disposed on the inner surface of the bottom of an enclosure 12 of the backlight unit 10. Each of the reflection layers 13*a* and 13*b* has a property like a foamed PET sheet as described above, reflects light in a high reflectance, however, a part of the incident light transmits to the rear side. In this embodiment, a region W with the reflection layers 13*a* and 13*b* being overlapped in the vertical direction (light incident direction), and a region S with only the reflection layer 13*b* provided are set up.

In this embodiment, using the reflection layers 13*a* and 13*b* for a two-layer structure described above, the reflectance at the central portion can be made relatively higher than that of the peripheral portion to achieve brightness gradient in the horizontal direction of a screen by locating the region W having the two reflection layers 13*a* and 13*b* at the region equivalent to the central portion of the screen in the horizontal direction, while the region S having the reflection layer 13*a* only at the region equivalent to the peripheral portion of the screen in the horizontal direction as explained in Embodiment 4 shown in FIGS. 8A and 8B. The difference from Embodiment 4 shown in FIGS. 8A and 8B is that brightness gradient in the vertical direction of a screen is achieved by setting the clearances between adjacent fluorescent lamps 11 at the positions equivalent to the central portion in the vertical direction of a screen smaller than the clearances between adjacent fluorescent lamps 11 at the position equivalent to the peripheral portion (the upper and lower ends shown in FIG. 9A). By arranging so, relatively higher brightness can be obtained at the central portion of a liquid crystal panel screen and in the vicinity thereof than the brightness at the peripheral portion of the screen, just like a display device using a cathode-ray tube.

As another different embodiment, brightness gradient in the vertical direction of a screen may be achieved by printing a material that degrades reflectance on the surface of the reflection layers 13*a* and 13*b* at positions equivalent to the peripheral portion of the screen (the upper and lower ends shown in FIG. 8A or 9A), or a material that degrades transmittance on the surface of fluorescent lamps 11.

Embodiment 6

Figure 10A:
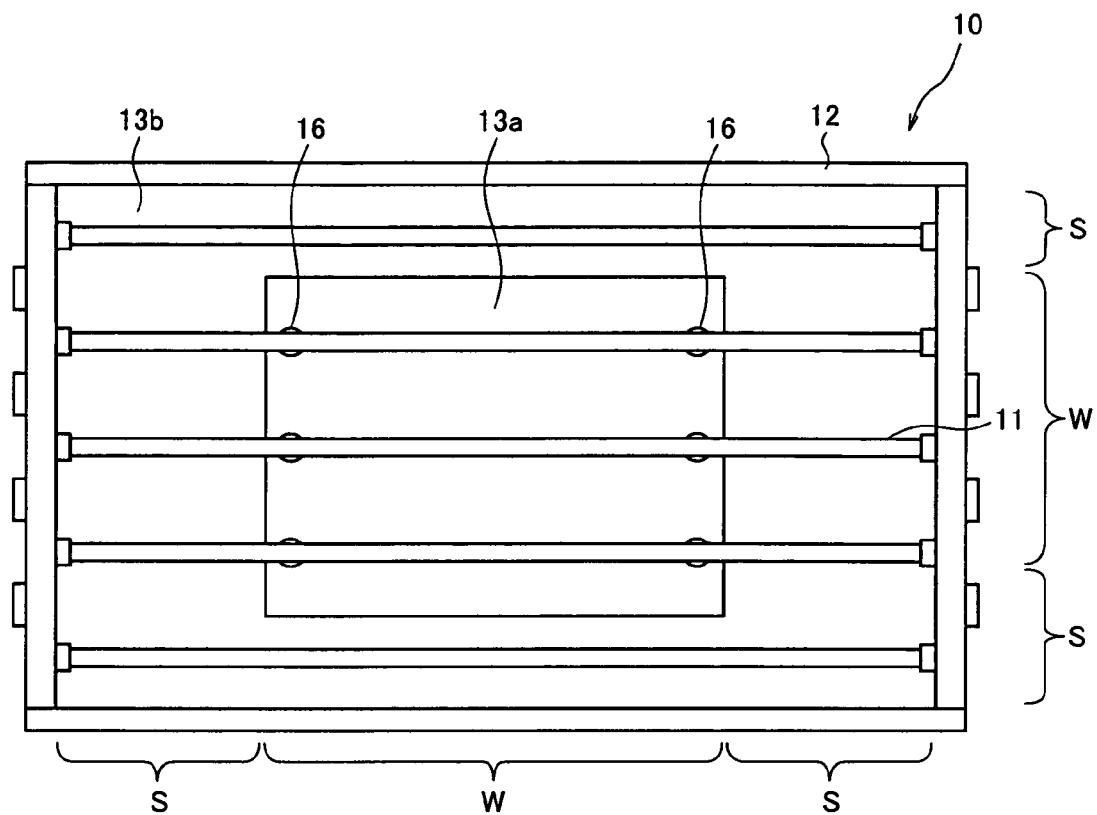
FIGS. 10A and 10B are drawings showing still yet another embodiment of the backlight unit of the present invention.
Figure 10B:
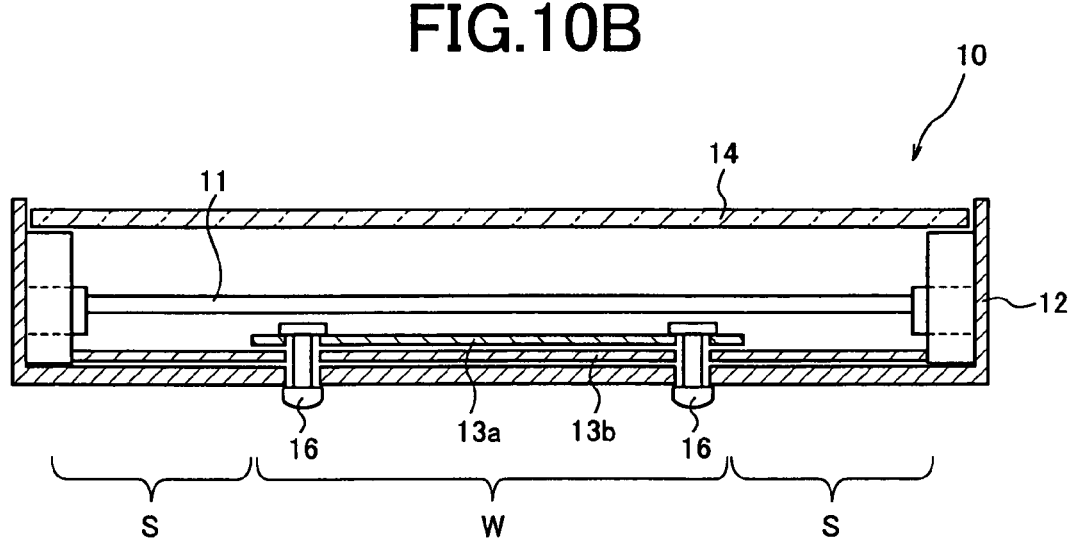

FIGS. 10A and 10B are drawings showing yet another embodiment of the backlight unit of the present invention. FIG. 10A is a schematic plane view showing the inside of the backlight unit, while FIG. 10B is a view showing a cross-section along a fluorescent lamp 11 shown in FIG. 10A of the structure, including a diffusion unit 14. In FIGS. 10A and 10B, reference numeral 16 shows a screw to be used as the supporting means for the reflection layers 13*a* and 13*b*. As shown in FIG. 2, the fluorescent lamps 11 are arranged so that the high voltage side and the low voltage side of each of the fluorescent lamps 11 are aligned respectively at the same sides.

The backlight unit shown in FIGS. 10A and 10B is provided with two reflection layers 13*a* and 13*b* as the reflection unit for causing the light from the fluorescent lamps 11 to exit toward a certain direction. Each of the reflection layers 13*a* and 13b has a property like a foamed PET sheet as described above, and reflects light in a high reflectance, however, some of the incident light transmits to the rear side. In this embodiment, a region W where the reflection layers 13a and 13b are overlapped in the vertical direction (light incident direction), and a region S where only the reflection layer 13b is provided, are set up.

In the structure shown in FIGS. 10A and 10B, the regions W and S are set up so that the area of the second reflection layer 13b on the rear side is larger than the area of the first reflection layer 13a on the front side, however, the area of the first reflection layer 13a may be larger.

In this embodiment, using the reflection layers 13a and 13b for a two-layer structure described above, the reflectance at the central portion (region W) is made relatively higher than that of the peripheral portion by setting up a region W comprising the two reflection layers 13a and 13b for only the region equivalent to the central portion in the horizontal and vertical directions of the screen, thereby brightness gradient in the horizontal and vertical directions of the screen is achieved.

As the first reflection layer 13a described above, a half mirror may be used, for example. By using a half mirror, the transmittance of the light that is reflected by the second reflection layer 13b and returned to the first reflection layer 13a (half mirror) can be improved, thereby achieving a high reflectance.

The brightness gradient forming means described in Embodiment 1 to Embodiment 3 may be used in combination with the two-layer structure consisting of the reflection layers 13a and 13b. In this embodiment, a structure using two reflection layers is described, however, more than two reflection layers may be provided.

As described in this embodiment, when the region W comprising two reflection layers 13a and 13b being overlapped, and the region S comprising only one reflection layer 13b are formed, a retaining element is preferably provided for each of reflection layers 13a and 13b, especially for the first reflection layer 13a located at the front side to provide retaining stability. For example, as shown in FIGS. 10A and 10B, a through-hole is provided to each of the enclosure 12, first reflection layer 13a and second reflection layer 13b, and a screw 16 is inserted into these through-holes to retain reflection layers 13a and 13b on the inner surface of the enclosure 12, thereby maintaining the shapes by preventing the reflection layers 13a and 13b from bending due to gravity, or another force. For this retaining means, any known means that enables the reflection layers 13a and 13b to be retained on the inner surface of the enclosure can be used besides the screw.

To prevent a retaining means such as the screw 16 described above from being projected on the display screen, arranging the retaining means so that the retaining means is hidden behind the fluorescent lamps 11 is preferable, as shown in FIG. 10B. Further, the retaining means may be provided with the function to retain the reflection layers 13a and 13b as well the function to retain the fluorescent lamps 11.

Embodiment 7

Figure 13:
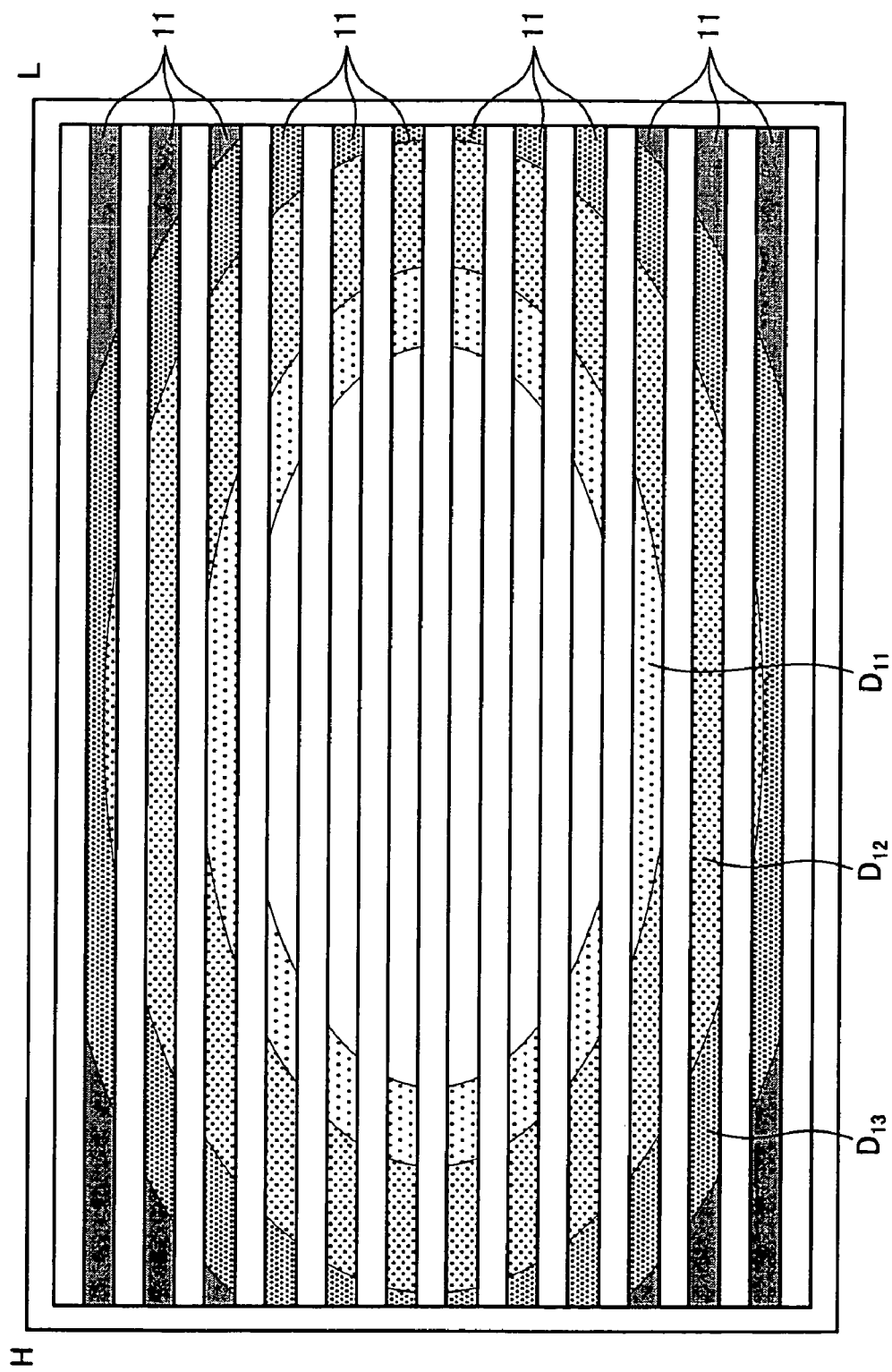
FIG. 13 is a drawing showing an example of a dot pattern to be formed when fluorescent lamps each being printed with the dot pattern are set at predetermined position in the backlight unit.

FIG. 11 is a drawing for explaining another embodiment of the backlight unit of the present invention, showing a schematic plane view of a fluorescent lamp 11. In this embodiment, brightness gradient forming means for forming brightness gradient at least in the horizontal and vertical directions of a display screen is provided on the glass tube constituting the fluorescent lamp 11. The brightness gradient forming means provided here does not control reflectance as provided in the embodiments described above, but controls light transmittance of the glass tube of the fluorescent lamp 11, however, the technological concept attempting to form brightness gradient by controlling the amount of exiting light to the object to be illuminated is shared. FIGS. 12A, 12B and 12C are the enlarged views showing the dot pattern printed on the glass tube shown in FIG. 1. The enlarged view of region $D_{13}$ shown in FIG. 11 is shown in FIG. 12A, region $D_{12}$ in FIG. 11 is shown in FIG. 12B and region $D_{11}$ in FIG. 12C. FIG. 13 shows a dot pattern example which is formed when the fluorescent lamps 11 with the dot pattern being printed are disposed at predetermined positions in the backlight unit.

In FIG. 11, a dot pattern for reducing light transmittance of the glass tube is used as the brightness gradient forming means. Here, three regions $D_{11}$, $D_{12}$ and $D_{13}$ with different dot densities are provided so that dot density becomes higher step by step from the central portion of the fluorescent lamp 11 toward the both ends. When each of the fluorescent lamps 11 with the dot pattern being printed are set up at predetermined positions in the backlight unit, the regions $D_{11}$, $D_{12}$ and $D_{13}$ formed by these fluorescent lamps 11 are, as shown in FIG. 13, substantially elliptical, having a major axis in the horizontal direction (right to left) and a minor axis in the vertical direction (top to bottom). In this embodiment, the dot pattern corresponding to the relative brightness distribution of the cathode-ray tube (relative brightness distribution characteristics 101) shown in FIG. 27 is applied to the glass tubes of the fluorescent lamps 11.

In this embodiment, the dot pattern to be applied to the glass tubes of the fluorescent lamps 11 is arranged so that the dot density of the applied regions $D_{11}$, $D_{12}$ and $D_{13}$ in the dot pattern is increased step by step from the central portion to the both ends for reducing the transmittance of the fluorescent lamps 11 from the central portion to the both ends. For example, as shown in FIG. 11, by using dots with same size for the dot pattern and by setting the density of dots higher as a region gets closer to the both ends. Thus, by changing transmittance of the glass tube from the central portion toward the peripheral portion, relatively higher brightness can be obtained at the central portion of a liquid crystal panel screen and in the vicinity thereof than the brightness at the peripheral portion of the screen, just like a display device using a cathode-ray tube.

The dot pattern for controlling transmittance as described above may control transmittance by changing density of dots with the same shape or by changing the shape (size) of dots, as the example shown in FIG. 11, and further by changing both of dot shape and density in combination. The color of a dot may be changed to change transmittance. For example, the shape of each dot in a dot pattern may be a circular, triangular, polygonal, star-shaped, elliptical, and the color of a dot may be gray, dark brown, silver, green, black, white, purple, or another color.

The dot pattern described above may obtain gradient by reducing transmittance little by little from the central portion toward the peripheral portion of the fluorescent lamps 11 and not by changing transmittance step by step as exemplified in FIG. 11. Such transmittance gradient can be achieved by changing either of the shape, size, density, or color, or any combination of these.

The dot pattern to be applied to the surface of a glass tube can be formed by applying ink on the glass tube by printing such as screen printing or inkjet printing. Besides printing, sputtering or vapor deposition, photolithography or optical machining using a laser beam, or lamination of transparent film having a dot pattern may be used to form a dot pattern.

As another practical example of the brightness gradient forming means to be applied to the glass tube of a fluorescent lamp 11, ink or dyestuff whose concentration changes can be applied to the glass tube in order to control the transmittance so that the transmittance decreases or increases step by step or gradually. The change in concentration may be achieved by changing the concentration of the dyestuff or pigment itself, or by changing apparent concentration caused by the change in the thickness of the film on which the ink or dyestuff is applied.

Alternatively, as brightness gradient forming means, a plurality of materials with different transmittances may be applied on the surface of the glass tube. Further, roughness of the surface of the glass tube may be changed to control transmittance based on differences of the optical diffusion characteristic or the optical absorption characteristic of the surface.

Embodiment 8

Figure 14A:
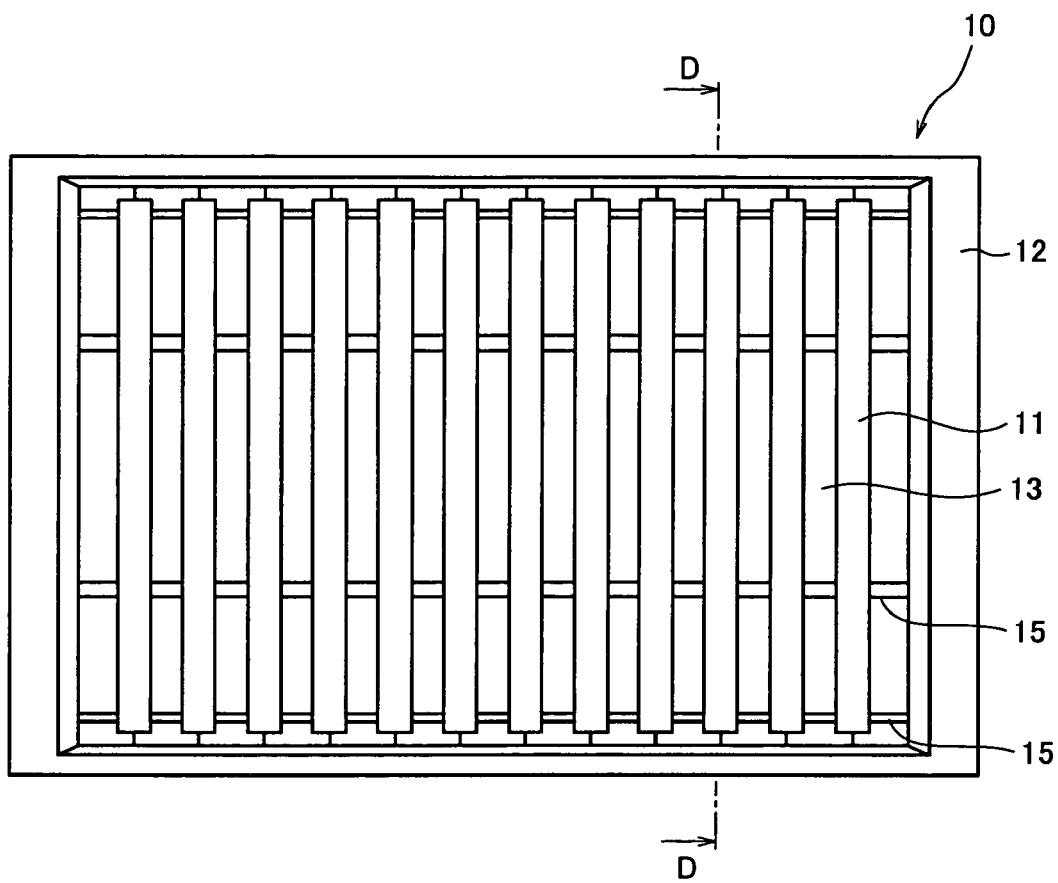
FIGS. 14A and 14B are drawings showing yet another embodiment of the backlight unit of the present invention.
Figure 14B:
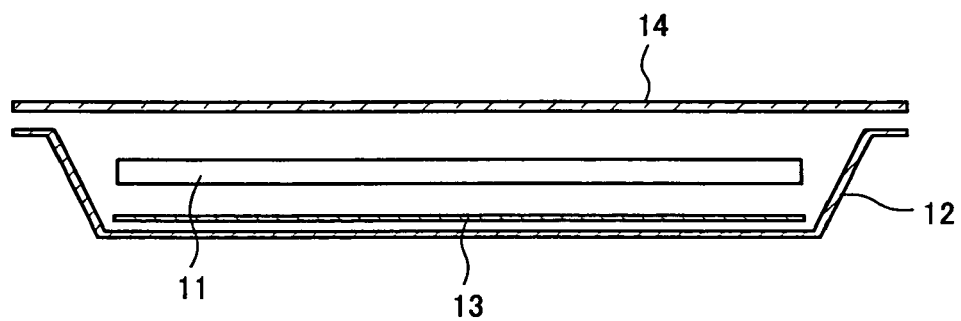
Figure 15:
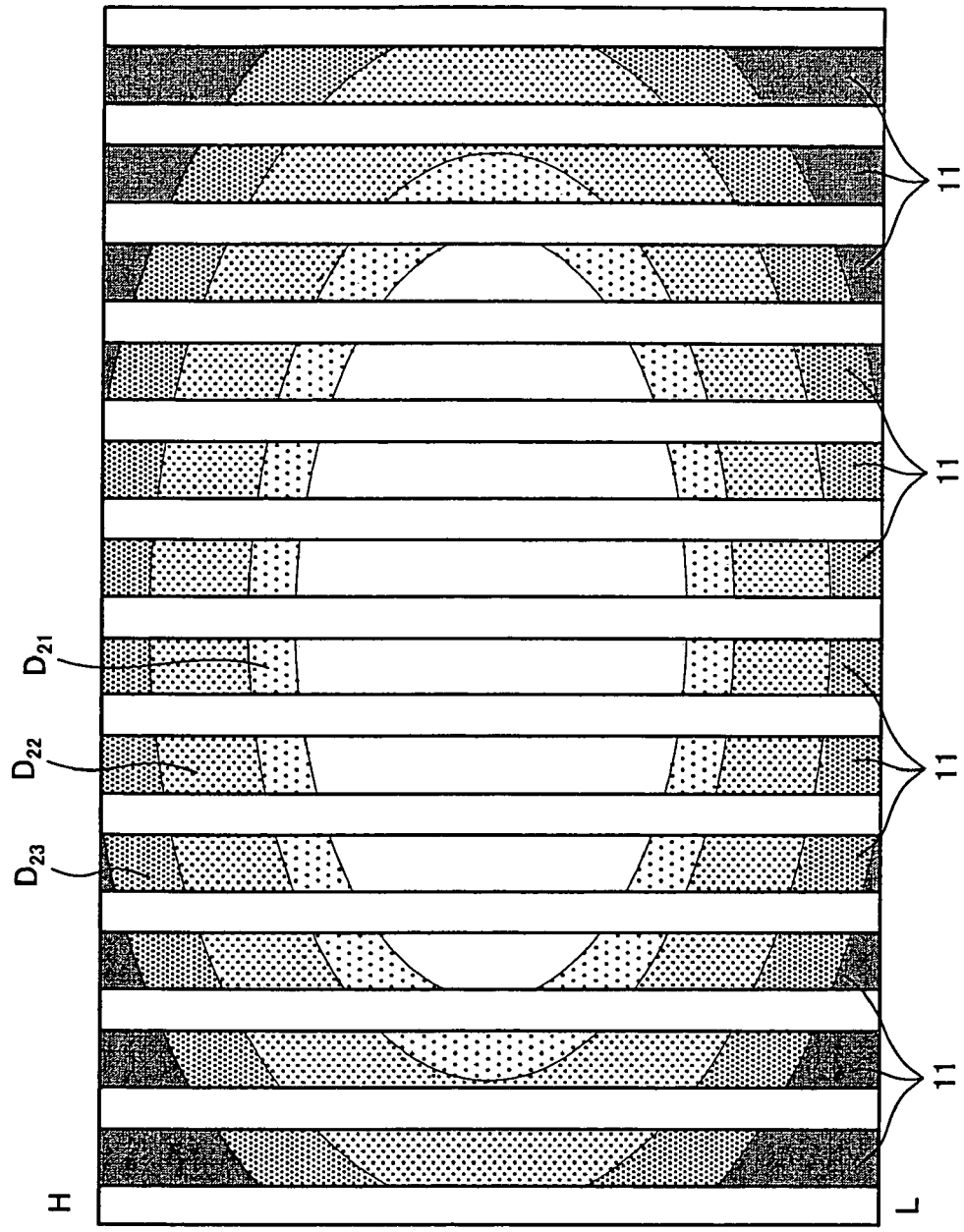
FIG. 15 is another example of a dot pattern to be formed when fluorescent lamps each being printed with the dot pattern are set at predetermined position in the backlight unit.

FIGS. 14A and 14B are drawings showing another embodiment of the backlight unit of the present invention. FIG. 14A is a schematic plane view showing the inside of the backlight unit, while FIG. 14B is a drawing showing a cross-section along D—D of FIG. 14A depicting a structure including a diffusion unit 14. In FIGS. 14A and 14B, fluorescent lamps 11 are arranged in the vertical direction in parallel with each other, and the high voltage side H and low voltage side L of each of the fluorescent lamps 11 are aligned respectively to the same sides. FIG. 15 is a drawing showing another exemplified dot pattern to be formed when fluorescent lamps 11 with a dot pattern being printed are disposed at predetermined positions in the backlight unit.

In this embodiment, a dot pattern that causes to reduce light transmittance of a glass tube is used as brightness gradient forming means. Here, regions $D_{21}$, $D_{22}$ and $D_{23}$ having dot patterns with three different densities are provided so that the dot density becomes larger step by step from the central portion to the both ends of a fluorescent lamp 11. When these fluorescent lamps 11 with dot patterns being printed are set up at predetermined positions in the backlight unit, the regions $D_{21}$, $D_{22}$ and $D_{23}$ formed by these fluorescent lamps 11 have, as shown in FIG. 15, substantially elliptical shape, having a major axis in the horizontal direction (right to left) and a minor axis in the vertical direction (top to bottom). In this embodiment, the dot pattern corresponding to the relative brightness distribution of the cathode-ray tube (relative brightness distribution characteristics 101) shown in FIG. 27 is applied to the glass tubes of the fluorescent lamps 11. This way, even when the fluorescent lamps 11 are vertically arranged, similar brightness gradient can be obtained as when the fluorescent lamps 11 are horizontally arranged.

Embodiment 9

FIGS. 16A to 16D are drawings for explaining another embodiment of the backlight unit of the present invention. A schematic cross-sectional view of the backlight unit is shown in FIG. 16A, and the schematic cross-sectional views of a fluorescent lamp 11 at positions B, C and D in FIG. 16A are shown in FIGS. 16B, 16C and 16D respectively. In FIGS. 16A to 16D, reference numeral 11a denotes a glass tube constituting a fluorescent lamp, 11b denotes a fluorescent substance provided on the inner surface of the glass tube, and d denotes the film thickness of the fluorescent substance.

In this embodiment, as brightness gradient forming means in order to form brightness gradient at least in the horizontal and vertical directions on a display screen, the brightness gradient described above is formed by changing the film thickness d of the fluorescent substance 11b to be formed on the inner side of the glass tube 11a of a fluorescent lamp in the longitudinal direction of the fluorescent lamp 11.

That is, in this embodiment, the property that tubular surface brightness changes in accordance with the film thickness d of the fluorescent substance 11b is used and radiation brightness gradient is achieved in the longitudinal direction of the fluorescent lamp 11 by changing the film thickness d of the fluorescent substance 11b in accordance with the position in the longitudinal direction of the fluorescent lamp 11. In the example shown in FIGS. 16A to 16D, the film thickness d of the fluorescent substance 11b of the fluorescent lamb 11 equivalent to the central portion of the screen is set to an optimum film thickness providing the highest brightness, and the film thickness d is set higher or lower toward the high voltage side H or low voltage side L.

Figure 17:
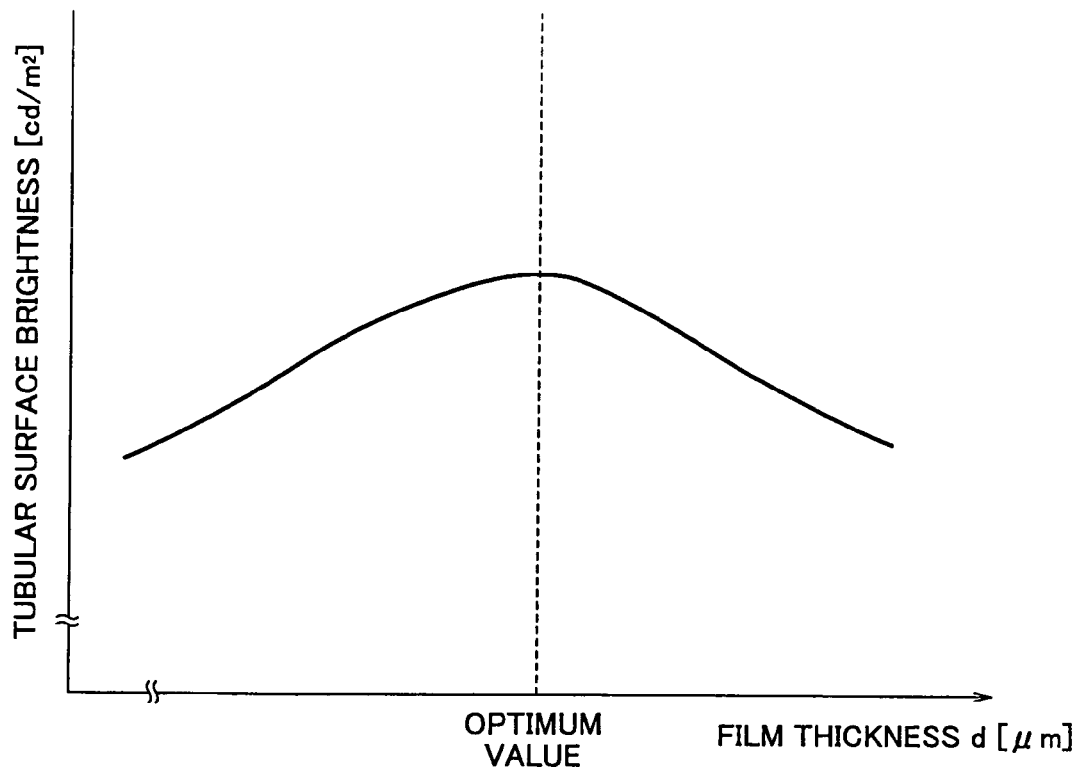
FIG. 17 is a chart showing an example of the relationship between film thickness of a fluorescent substance and tubular surface brightness (radiation brightness).

FIG. 17 is a chart showing an example of the relationship between film thickness d of a fluorescent substance and tubular surface brightness (radiation brightness). As shown in FIG. 17, irrespective of material, film thickness d of a fluorescent substance generally changes brightness at turn-on in accordance with the film thickness d of the fluorescent substance. An optimum value of the film thickness d for the light to be emitted most brightly exists. That is, as shown in FIG. 17, the light gets dark due to insufficient amount of fluorescent substance when the film thickness d is smaller than the optimum value, on the contrary, the light gets dark due to diffusion of light within the film when the film thickness d gets greater than the optimum value.

In this embodiment, by utilizing the characteristics described above, the film thickness d of the fluorescent substance 11b is changed by setting the film thickness d of the fluorescent substance to the optimum film thickness that provides the highest brightness at the substantially central portion of the fluorescent lamp 11 and by increasing or decreasing the film thickness d toward the high voltage side H or low voltage side L at the either ends. In doing so, brightness is reduced either when the film thickness d gets greater than or smaller than the optimum value as described above, and by utilizing this characteristics, brightness gradient is formed on each of the fluorescent lamps 11, to form brightness gradient at least in the horizontal and vertical directions of a display screen.

The method applying brightness gradient forming means to a glass tube itself of a fluorescent lamp 11, as described in Embodiment 7 to Embodiment 9, can be applied not only to the straight tube type fluorescent lamps but U-shaped, block C-shaped and L-shaped fluorescent lamps.

Embodiment 10

Figure 18:
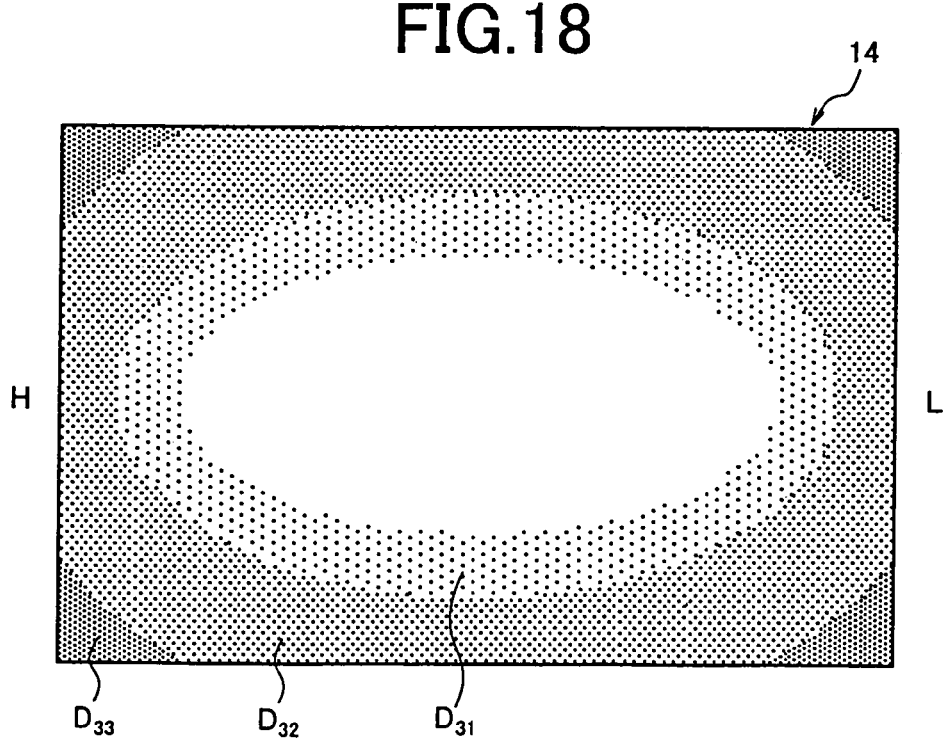
FIG. 18 is a drawing showing still another embodiment of the backlight unit of the present invention.

FIG. 18 is a drawing for explaining another embodiment of the backlight unit of the present invention. In this embodiment, brightness gradient forming means for forming brightness gradient at least in the horizontal and vertical directions of a display screen is provided in a diffusion unit 14. As the diffusion unit 14, a diffusing plate or diffusing sheet having light diffusing function is used. On the surface of such a diffusion unit 14, brightness gradient forming means for controlling light transmittance is provided.

For example, as shown in FIG. 18, a dot pattern for reducing light transmittance is applied on the surface of the diffusion unit 14. Here, regions $D_{31}$, $D_{32}$ and $D_{33}$ having dot patterns with three different densities are provided so that the dot density becomes larger step by step from the central portion to the peripheral portion of a display screen. The regions $D_{31}$, $D_{32}$ and $D_{33}$ have substantially elliptical shape and are formed to have a major axis in the horizontal direction (right to left) and a minor axis in the vertical direction (top to bottom). In this embodiment, the dot pattern corresponding to the relative brightness distribution of the cathode-ray tube (relative brightness distribution characteristics 101) shown in FIG. 27 is applied to a reflection layer 13. It is more preferable to provide the dot pattern on the rear side (the side of the fluorescent lamp 11) than to provide the dot pattern on the front side of a diffusion unit 14 (the other side of the fluorescent lamp 11), as diffusion uniformity within the surface of the diffusion unit 14 is less affected by this arrangement.

Further, as a brightness gradient forming means for controlling light transmittance described above, the brightness gradient forming means used in the fluorescent lamp 11 of Embodiment 9 described above is similarly applicable. In this embodiment, brightness gradient may be changed at least in the horizontal and vertical directions by changing the thickness of the diffusion unit 14 from the central portion of the screen to the peripheral portion, thereby changing the transmittance of the light that transmits the diffusion unit 14.

Here in the embodiments described above, structural examples of a direct type backlight unit has been explained, however, the backlight unit of the present invention can be applied not only to a direct type backlight unit, but also to an edge light type backlight unit. That is, brightness gradient forming means provided on a reflection layer or reflection surface that constitutes a reflection unit, florescent lamps, and diffusion unit in each of the embodiments described above, is not applicable only to a direct type backlight unit but edge light type backlight unit, and relatively higher brightness can be obtained at the central portion of a liquid crystal panel screen and in the vicinity thereof than the brightness at the peripheral portion of the screen, just like a display device using a cathode-ray tube.

Embodiment 11

By configuring a liquid crystal display device using a backlight unit having the brightness gradient forming means as described in any of the embodiments described above, brightness gradient is formed at least in the horizontal and vertical directions on a display screen and relatively higher brightness can be obtained at the central portion of a display screen of a liquid crystal panel and in the vicinity thereof than the brightness at the peripheral portion of the screen, just like a display device using a cathode-ray tube.

Figure 19A:
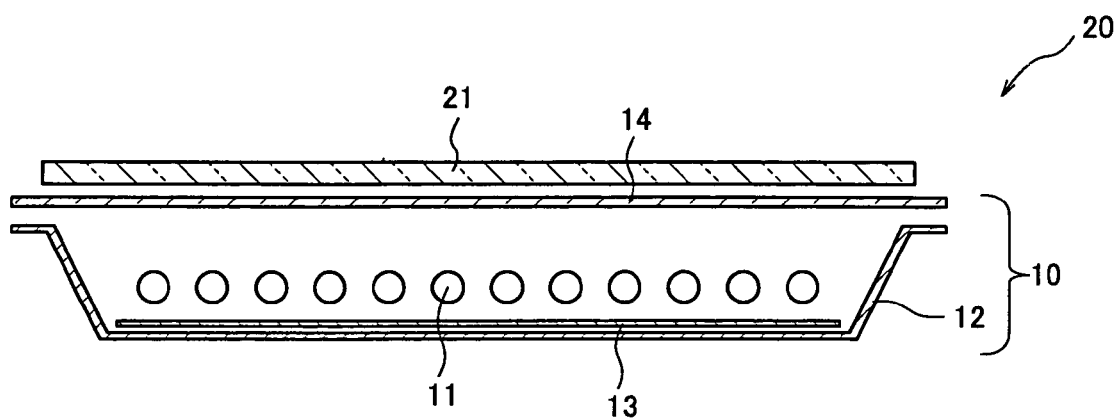
FIG. 19A is a drawing showing an embodiment of a liquid crystal display device of the prevent invention.
Figure 19B:
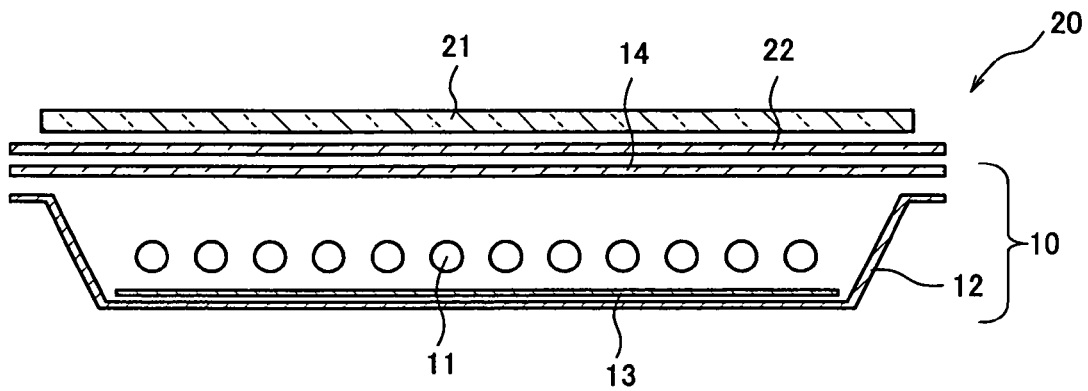
FIG. 19B is a drawing showing another embodiment of the liquid crystal display device of the prevent invention.

FIG. 19A is a drawing for explaining an embodiment of a liquid crystal display device of the prevent invention, which shows a schematic cross-sectional structure of a liquid crystal display device having a backlight unit. In FIG. 19A, reference numeral 20 denotes a liquid crystal display device, and reference numeral 21 denotes a liquid crystal panel. FIG. 19B is a drawing for explaining another embodiment of a liquid crystal display device of the prevent invention, which shows a schematic cross-sectional structure of a liquid crystal display device having a backlight unit but which has a polarizing reflective film 22 provided between the diffusion unit 14 and the liquid crystal panel 21 in addition to the configuration of the liquid crystal display device 20 shown in FIG. 19A.

The liquid crystal display device 20 is provided with a general liquid crystal panel 21 with liquid crystal material sealed between two transparent insulation substrates, which is the key structural element, and a backlight unit 10 for illuminating light to the liquid crystal panel 21. For the backlight unit 10 provided in the liquid crystal display device 20 of this embodiment, a backlight unit of any of aforementioned Embodiments 1 to 10 can be applied.

By illuminating the liquid crystal panel 21 using the backlight unit 10 provided with the brightness gradient forming means covered by the present invention, brightness gradient is formed at least in the horizontal and vertical directions of the display screen of the liquid crystal panel 21, thereby achieving a similar brightness distribution characteristics provided by a display device using a cathode-ray tube.

Generally as an aspect ratio of a display screen that matches to human visual sense characteristics, an aspect ratio of 16:9 is used, for example. Therefore, in a liquid crystal display device of the present invention, the aspect ratio of the display screen may be set to 16:9. In this case, the aspect ratio of the aforementioned reflection layer or reflection surface, and that of the diffusion unit are also set to 16:9. By setting so, an image matching to human visual sense characteristics and providing the feeling of presence can be obtained.

In FIG. 19B, a liquid crystal display device with high light utilization efficiency can be obtained by providing a polarizing reflective film 22 between a liquid crystal panel 21 and a diffusion unit 14 of a backlight unit 10 in the liquid crystal display device 20 described above. Here, the polarization transmission axis of the polarizing reflective film 22 is aligned with the polarization transmission axis of the incident side polarizer of the liquid crystal panel 21. If any polarization fraction in the perpendicular direction (the fraction matching to the polarization transmission axis) is created when the polarization fractions reflected by the polarizing reflective film 22 is diffused or reflected by the diffusion unit 14 or reflection layer 13, or another, the fraction is allowed to transmit the polarizing reflective film 22, thus can be used as the effective light to the liquid crystal panel 21. Thus, the polarizing reflective film 22 enables the illumination light with aligned polarizing direction to be generated efficiently, thereby obtaining a liquid crystal display device with high light utilization efficiency by aligning the deflecting direction of this illumination light to the polarization axis of the polarizer at the incident side. Between the polarizing reflective film 22 and the diffusion unit 14, a functional film or sheet such as ITO sheet, diffusing film or prism sheet, and another can be provided further.

Embodiment 12

Figure 20:
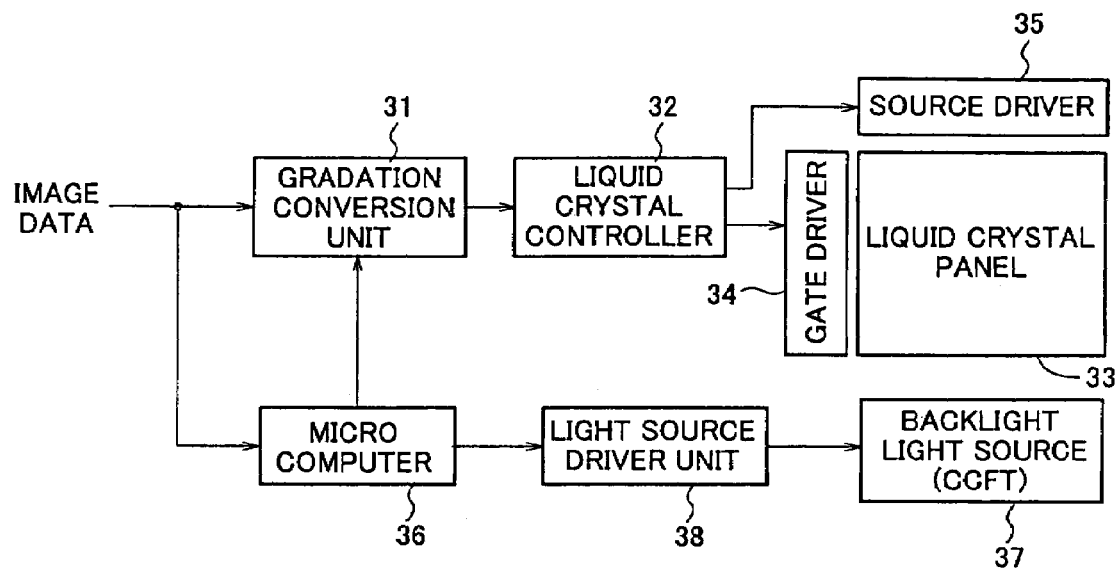
FIG. 20 is a block diagram of key units showing a schematic structure of another embodiment of the liquid crystal display device of the present invention.
Figure 21:
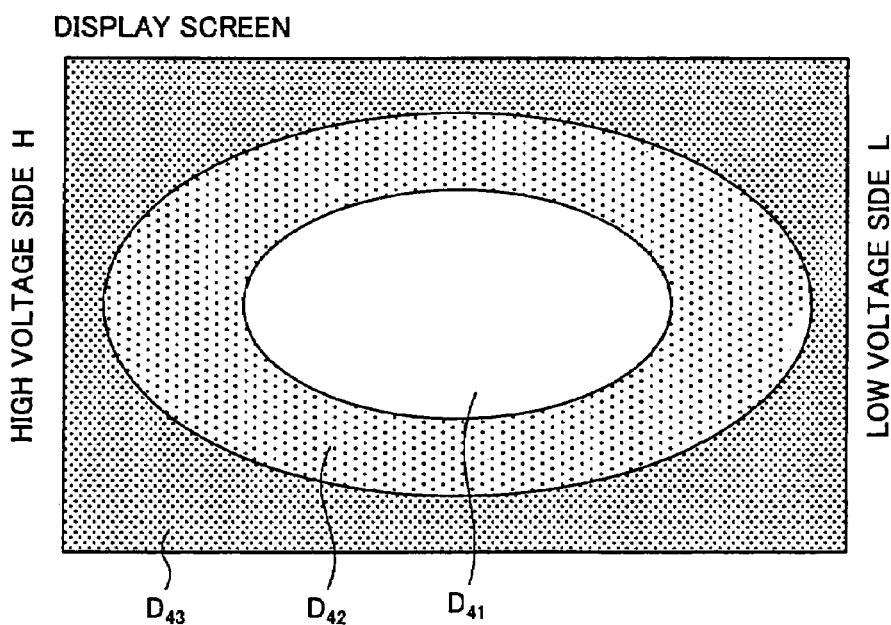
FIG. 21 is an illustrative drawing showing display screen regions in the liquid crystal display device shown in FIG. 20.
Figure 22:
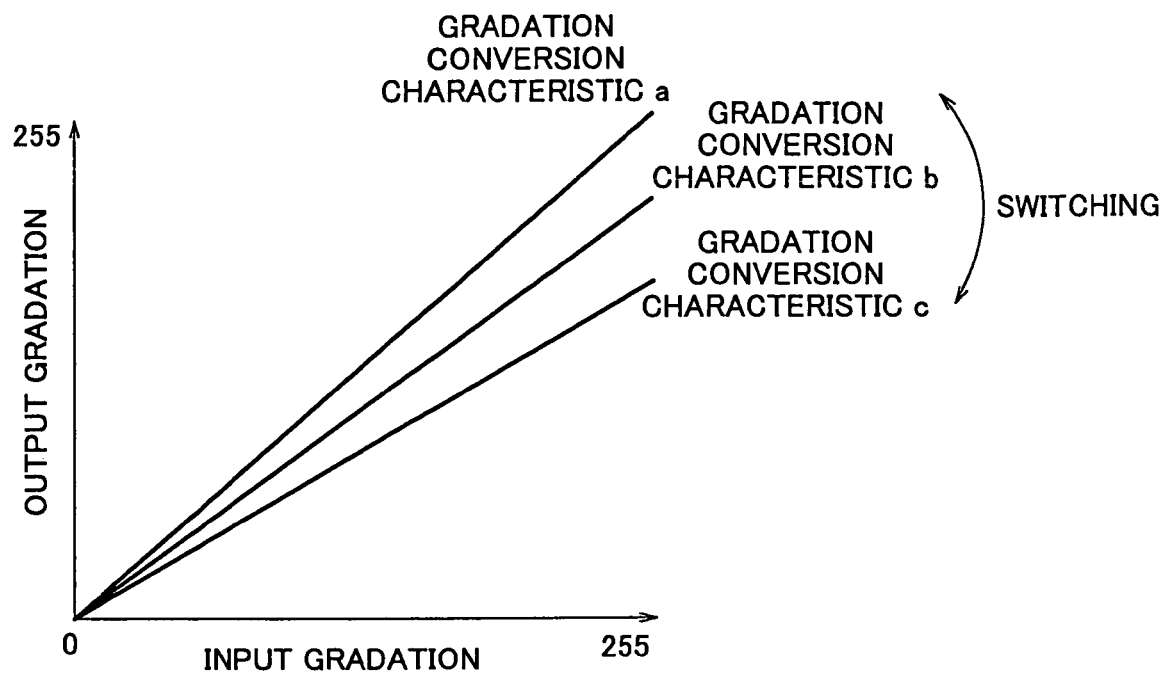
FIG. 22 is an illustrative drawing showing gradation conversion characteristics (input/output characteristics) of a gradation conversion unit in the liquid crystal display device shown in FIG. 20.

In this embodiment, by controlling display image data to be supplied to the liquid crystal panel of a liquid crystal display device, brightness gradient is formed at least in the horizontal and vertical directions of the display screen of the liquid crystal panel so that relatively higher brightness can be obtained at the central portion of a display screen and in the vicinity thereof than the brightness at the peripheral portion of the screen, just like a display device using a cathode-ray tube. Now referring to FIGS. 20 to 22, this embodiment is described. Here, FIG. 20 is a block diagram of key units showing a schematic structure of the liquid crystal display device of this embodiment. FIG. 21 is an illustrative drawing indicating display screen regions in the liquid crystal display device of this embodiment, and FIG. 22 is an illustrative drawing showing gradation conversion characteristics (input/output characteristics) of a gradation conversion unit in the liquid crystal display device of this embodiment.

As shown in FIG. 20, the liquid crystal display device of this embodiment is provided with a gradation conversion unit 31 carrying out a predetermined gradation conversion process with the input image data, and a liquid crystal controller 32 outputting liquid crystal driving signals to a gate driver 34 and a source driver 35 of a liquid crystal panel 33. The liquid crystal display device is also provided with a microcomputer 36 controlling a light source driver unit 38 for switching and controlling gradation conversion characteristics at the gradation conversion unit 31 based on the synchronization signal of the input image data, and for driving a backlight light source (fluorescent lamps) 37.

That is, the microcomputer 36 determines the position on the screen where the image data is displayed based on the synchronization signal of the input image data, then outputs an instruction to the gradation conversion unit 31 to switch gradation conversion characteristics of the gradation conversion unit 31 in accordance with the position on the screen. Here, as shown in FIG. 21, the display screen is divided into region $D_{41}$ equivalent to the central portion of the display screen, region $D_{42}$ equivalent to the peripheral portion thereof, and region $D_{43}$ equivalent to the most peripheral portion, and gradation conversion characteristics for the data is switched based on the information regarding either of divided regions $D_{41}$, $D_{42}$ or $D_{43}$ the data is to be displayed.

The gradation conversion unit 31 has a gradation conversion characteristic a that outputs an input gradation level as it is (with no conversion being carried out), a gradation conversion characteristic b that outputs an input gradation level after being slightly suppressed, and a gradation conversion characteristic c that outputs an input gradation level after being further suppressed, wherein these characteristics are switchable. The gradation conversion unit 31 may use for example a look-up table (LUT), or may use a multiplication circuit that multiplies the input image data by a given coefficient. In the latter case, for example, gradation conversion characteristics a to c shown in FIG. 22 can be implemented by switching the multiplication coefficient ka=1.0, multiplication coefficient kb=0.9, and multiplication coefficient kc=0.8 according to the control signal sent from the microcomputer 36, and multiplying the input image data with the switched one of these coefficient.

The microcomputer 36 outputs a control signal to the gradation conversion unit 31 to select the gradation conversion characteristic a when the screen position of the image data to be displayed belongs to the region $D_{41}$ on the display screen. That is, the gradation conversion characteristic a is selected for the image data to be displayed in the region $D_{41}$ on the display screen, they are outputted on the liquid crystal controller 32 as they are (with no conversion being carried out). The microcomputer 36 outputs a control signal to the gradation conversion unit 31 to select the gradation conversion characteristic b when the screen position of the image data to be displayed belongs to the region $D_{42}$ on the display screen. That is, the gradation conversion characteristic b is selected and the gradation conversion process is carried out for the image data to be displayed in the region $D_{42}$ on the display screen, thus the display brightness in the region $D_{42}$ on the display screen is slightly reduced. Further, the microcomputer 36 outputs a control signal to the gradation conversion unit 31 to select the gradation conversion characteristic c when the screen position of the image data to be displayed belongs to the region $D_{43}$ on the display screen. That is, the gradation conversion characteristic c is selected and the gradation conversion process is carried out for the image data to be displayed in the region $D_{43}$ on the display screen, thus the display brightness in the region $D_{43}$ on the display screen is further reduced.

By arranging so, the light transmittance of the liquid crystal panel 33 at the peripheral portion on the display screen is reduced (display brightness is reduced), compared with the light transmittance at the central portion, thereby achieving a similar brightness distribution provided by a display device using a cathode-ray tube. As described above, in this embodiment, by controlling gradation level of the image data according to the screen position of the image data to be displayed, brightness gradient at least in the horizontal and vertical directions can be achieved so that the peripheral portion of the display screen is darker than the central portion.

In the embodiment described above, the display screen is divided into three regions of $D_{41}$, $D_{42}$, and $D_{43}$, which are concentrically and elliptically formed, and gradation conversion characteristics a, b, or c for image data to be displayed in each of divided regions $D_{41}$, $D_{42}$, and $D_{43}$ is selected and switched, however, it will be understood without mentioning that the number of regions into which the display screen is divided and the positions of divided regions can be changed as necessary in accordance with a display screen size or aspect ratio.

The brightness gradient may be achieved at least in the horizontal and vertical directions of a display screen by varying the reference gradation voltage for driving a liquid crystal panel according to a display screen position on a liquid crystal panel.

Embodiment 13

In a liquid crystal display device, the brightness gradient may be achieved in the horizontal and vertical directions of a display screen by changing aperture ratio according to a display screen position on a liquid crystal panel. That is, the amount of light that transmits a liquid crystal panel can be increased by setting the aperture ratio at the central portion of the screen of the liquid crystal panel to a greater value, while the amount of light that transmits the liquid crystal panel can be decreased by setting the aperture ratio at the peripheral portion of the screen of the liquid crystal panel to a smaller value. Thus, the brightness distribution can be formed in which the central portion of the display screen becomes brighter than the peripheral portion thereof, just like a display device using a cathode-ray tube.

Figure 23:
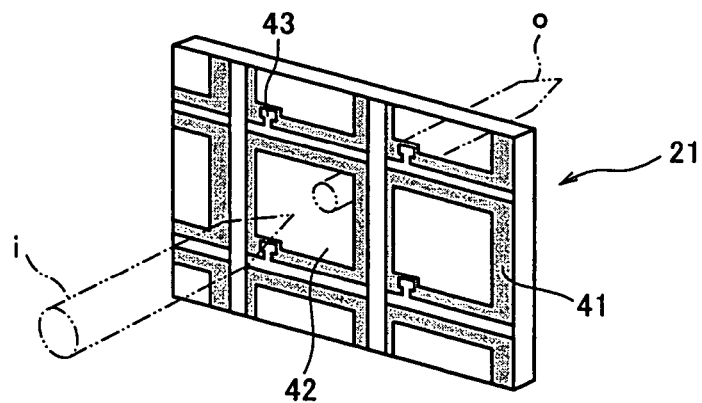
FIG. 23 is a drawing showing an example of structure for controlling aperture ratio of a liquid crystal panel.

FIG. 23 is a drawing showing an exemplified structure for controlling the aperture ratio of a liquid crystal panel, wherein reference numeral 21 denotes the liquid crystal panel, reference numeral 41 denotes a light shielding film, reference numeral 42 denotes a transparent electrode, reference numeral 43 denotes a TFT driver element, i denotes incident light for the liquid crystal panel, and o denotes the light exiting from the liquid crystal panel. On a liquid crystal panel 21, a shielding film 41 generally using meshed metal film is provided. In an example of this embodiment, brightness gradient is formed based on the light transmittance of each pixel by controlling the aperture ratio of each pixel provided by the light shielding film 41 in forming the light shielding film 41, so that brightness gradient is formed at least in the horizontal and vertical directions of the display screen, thereby obtaining a brighter display screen at the central portion than the peripheral portion of the display screen, just like a display device using a cathode-ray tube.

Embodiment 14

Figure 24A:
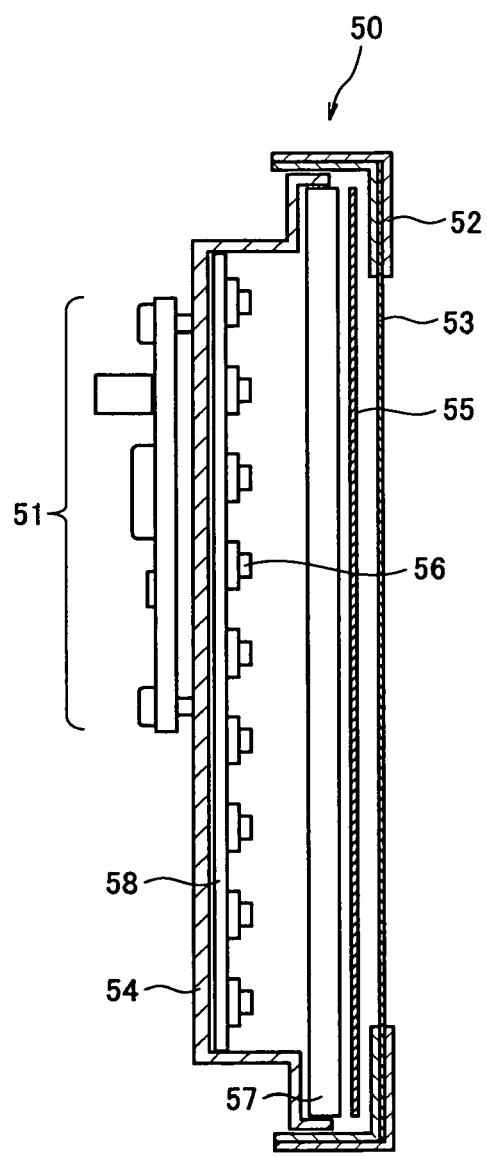
FIG. 24A is a drawing showing another embodiment of the liquid crystal display device (or backlight unit) of the present invention.

FIG. 24A is a drawing for explaining another embodiment of the liquid crystal display device (or backlight unit) of the present invention, showing a schematic cross-sectional structure of the liquid crystal display device having a backlight unit with LEDs as the light source. In FIG. 24A, reference numeral 50 denotes a liquid crystal display device, and the liquid crystal display device 50 has a circuit substrate 51 with a control circuit mounted thereon, a rim 52 supporting the liquid crystal panel, a liquid crystal panel 53, a frame 54 of the backlight unit, a polarizing reflective film 55, point light sources (LED) 56, and also has a diffusion unit 57, which diffuses the light directly entering from a LED 56 or the light going forward after being reflected by the reflection unit 58, provided on the rear side of the LEDs 56. The LEDs 56 illuminate the liquid crystal panel 53 disposed at the front side through the diffusion unit 57.

Figure 24B:
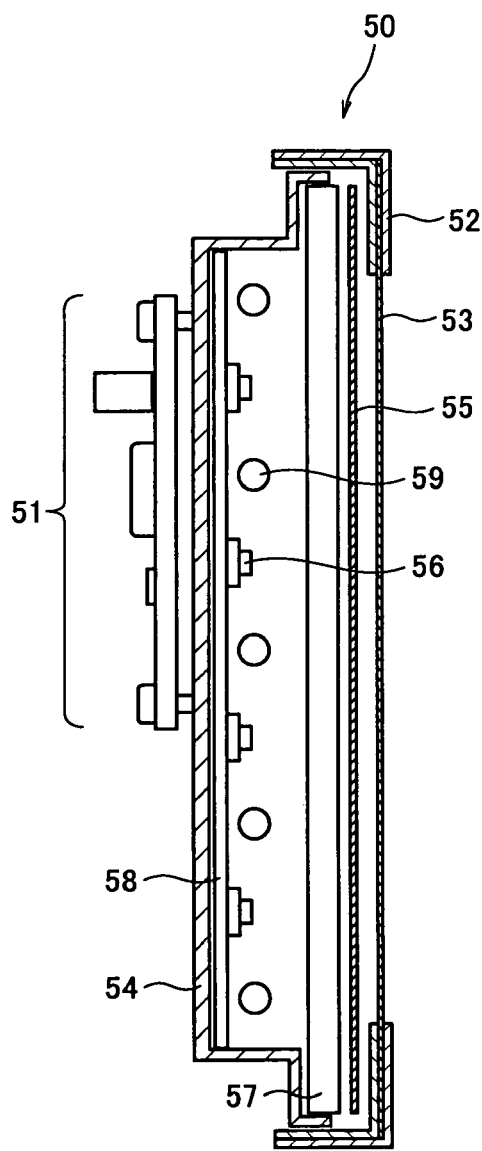
FIG. 24B is a drawing showing still another embodiment of the liquid crystal display device (or backlight unit) of the present invention.

FIG. 24B is a drawing for explaining another embodiment of the liquid crystal display device (or backlight unit) of the present invention, showing a schematic cross-sectional structure of a liquid crystal display device having a backlight unit. In FIG. 24B, fluorescent lamps 59 are provided as the light source to the frame 54 of the backlight unit in addition to the configuration of the liquid crystal display device 50 shown in FIG. 24A.

In this embodiment, the brightness gradient forming means for forming brightness gradient at least in the horizontal and vertical directions of the display screen is achieved by using either radiation brightness, radiation wavelength or surface density of the LEDs which are the point light sources, or any combination thereof.

Figure 25:
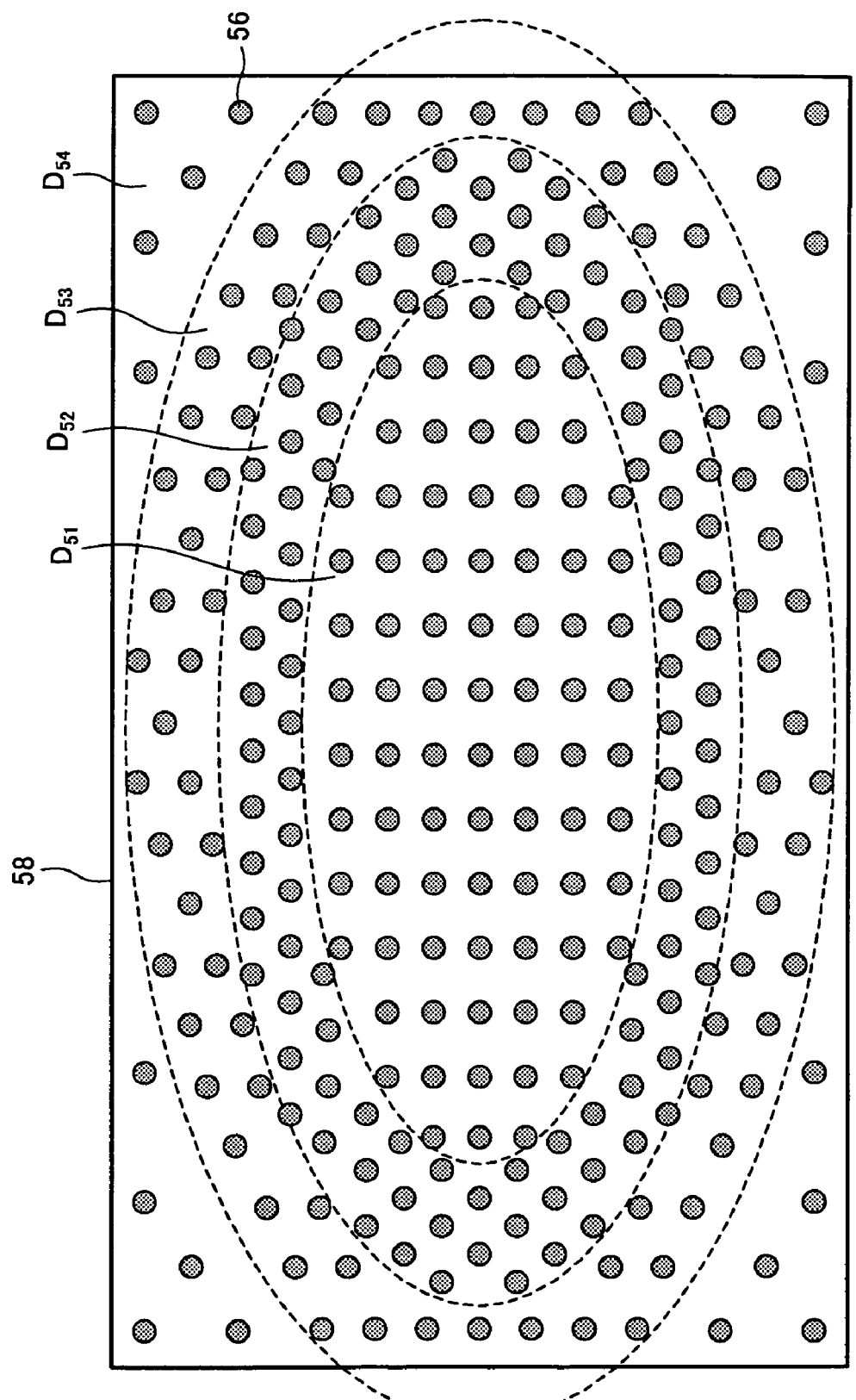
FIG. 25 is a drawing showing an example where LEDs are arranged in the backlight unit of the present invention so that they have different surface densities in different regions.

FIG. 25 is a drawing for explaining an example where LEDs are arranged in the backlight unit of the present invention, so that they have different surface densities in different regions. The brightness of the backlight unit can be controlled by the ratio of the area in which an LED is included against the area in which no LED is included, that is, the difference in surface densities of LEDs. The brightness gradient forming means of this embodiment forms brightness gradient at least in the horizontal and vertical directions of the display screen by utilizing the differences in the surface densities.

In FIGS. 24A and 25, many LEDs 56 with substantially same brightness are provided on the reflection unit 58. The four regions $D_{51}$, $D_{52}$, $D_{53}$ and $D_{54}$ are the regions which are created by dividing the display screen to form concentric ellipses that are substantially symmetric in left-to-right and top-to-bottom directions, and are set up sequentially from the central side to the peripheral portion of the display screen. First, in the region $D_{51}$ at the central portion, the brightness on the display screen is set to be relatively highest by disposing LEDs 56 at high density. In the region $D_{52}$, which is the next outer region, LEDs 56 are arranged with a density lower than that in region $D_{51}$, then in the region $D_{53}$, which is further outer region, LEDs 56 are arranged with a further lower density. In the most outer region $D_{54}$, LEDs 56 are arranged with the lowest density, thereby decreasing the brightness on the display screen to relatively the lowest. In this way, brightness gradient can be formed in the horizontal and vertical directions of the display screen by changing the density of LEDs 56 with the substantially same brightness for each region.

For example, in order to obtain the relative brightness distribution characteristic 101 shown in FIG. 27, setting up four different regions $D_{51}$, $D_{52}$, $D_{53}$ and $D_{54}$ from the central portion to the peripheral portion of the backlight unit, and adjusting the density of LEDs 56 in each region so that the density of LEDs 56 becomes sequentially smaller toward the peripheral portion from the central portion of the backlight unit, as shown in FIG. 25 are sufficient. By using the brightness gradient forming means of this embodiment, a liquid crystal display device with a backlight unit having point light sources such as LEDs 56 can obtain a display characteristics similar to the relative brightness distribution provided by a general display device having a cathode-ray tube.

Thus, by applying the backlight unit of this embodiment as the backlight for a liquid crystal display device, the brightness by the LEDs becomes lower and lower toward the peripheral portion, thereby making the central portion relatively brighter and the peripheral portion darker as a whole backlight unit, and a display device having brightness distribution similar to the brightness distribution characteristics of a cathode-ray tube can be obtained.

Embodiment 15

Figure 26:
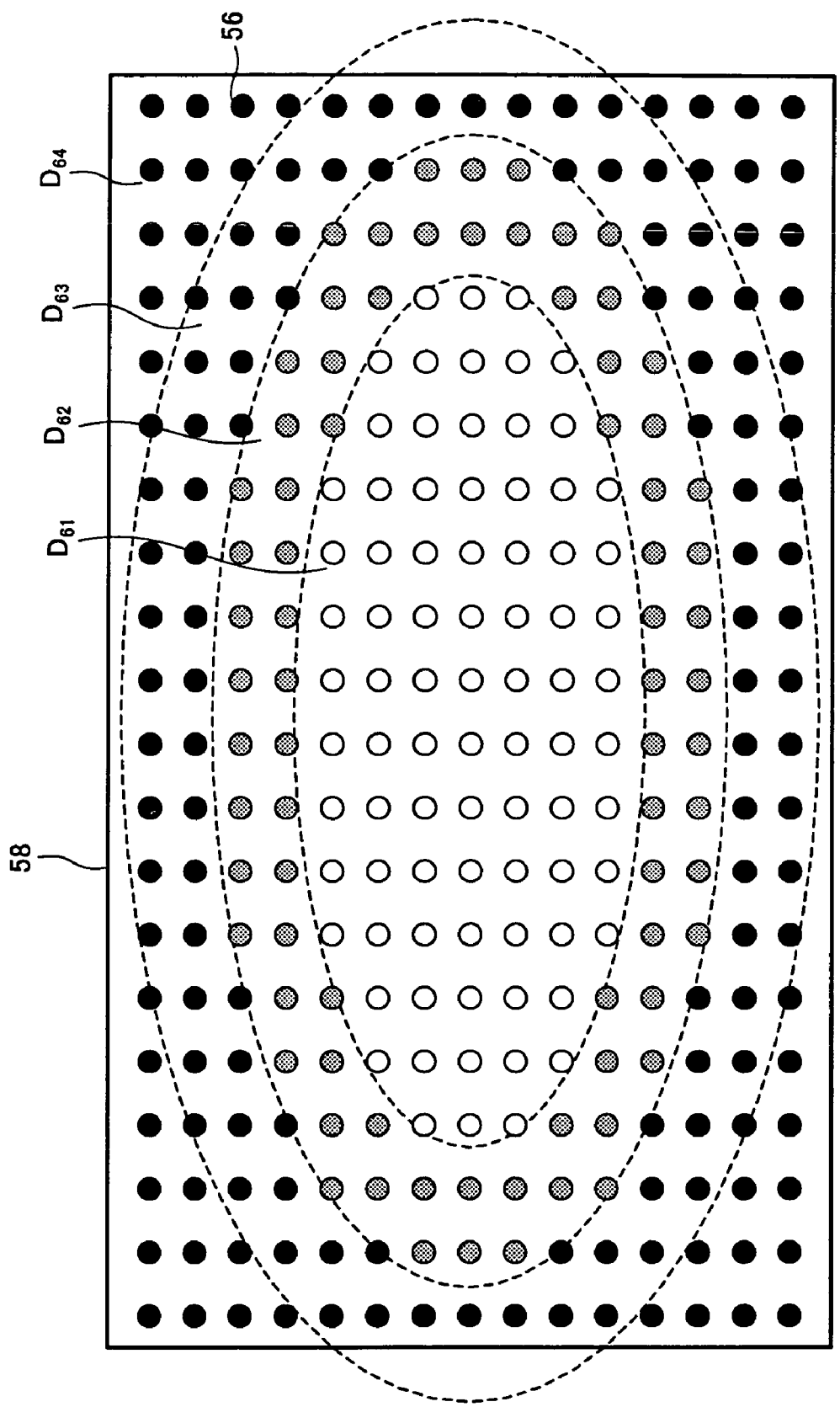
FIG. 26 is a drawing showing an example where LEDs are arranged so that LEDs have different radiation brightness in each of the regions in the backlight unit of the present invention.

FIG. 26 is a drawing for explaining an example where LEDs are arranged so that LEDs in each of the regions in the backlight unit of the present invention have different radiation brightness. The brightness of the backlight unit can be controlled by the difference in the radiation brightness or radiation wavelength, when the surface density of LEDs is the same. The brightness gradient forming means in this embodiment forms brightness gradient at least in the horizontal and vertical directions of the display screen by utilizing the differences in the radiation brightness or radiation wavelength.

In FIGS. 24A and 26, many LEDs 56 with different radiation brightness are provided in each of the regions on a reflection unit 58. The four regions $D_{61}$, $D_{62}$, $D_{63}$ and $D_{64}$ are the regions which are created by dividing the display screen to form concentric ellipses that are substantially symmetric in left-to-right and top-to-bottom directions, and are set up sequentially from the central side to the peripheral portion of the display screen. First, in the region $D_{61}$ at the central portion, LEDs 56 with the high radiation brightness are disposed to set the brightness on the display screen relatively the highest. In the region $D_{62}$, which is the next outer region thereof, LEDs 56 with a lower radiation brightness are disposed then in the region $D_{63}$, and $D_{64}$ which is further outer regions, LEDs 56 having a more lower radiation brightness and a further lower radiation brightness respectively are disposed. In the most outer region $D_{64}$, LEDs 56 with the lowest radiation brightness are disposed, to set the brightness on the display screen relatively the lowest. This way, brightness gradient in the horizontal and vertical directions of the display screen can be formed by changing the radiation brightness of LEDs with substantially the same density.

For example, in order to obtain relative brightness distribution characteristic 101 as shown in FIG. 27, setting up four different regions $D_{61}$, $D_{62}$, $D_{63}$ and $D_{64}$ from the central portion to the peripheral portion of the backlight unit, and adjusting the radiation brightness of LEDs 56 in each region so that the radiation brightness of LEDs 56 becomes sequentially smaller toward the peripheral portion from the central portion of the backlight unit, as shown in FIG. 26 are sufficient. Thus, by using brightness gradient forming means of this embodiment, the display characteristics similar to the relative brightness distribution of a general display device with a cathode-ray tube can also be obtained by a liquid crystal display device having a backlight unit with point light sources such as LEDs 56.

In a backlight unit of this embodiment, different from the backlight unit of Embodiment 14 described above, the density of LEDs 56 which are the light source is substantially the same and the brightness of LEDs 56 becomes lower from the central portion (region $D_{61}$) toward the peripheral portion ($D_{62}$, $D_{63}$, $D_{64}$) of the backlight unit. The brightness of LEDs 56 can be adjusted, for example, by the difference in dominant radiation wavelength within the visible light wavelength region (difference in brightness of R, G or B), and by the difference in voltages to be applied to the LEDs in the visible light wavelength region. The brightness of LEDs 56 may also be controlled by varying the duty ratio of dimmer signals for a LED turn-on circuit. The brightness may be adjusted by disposing a filter in front of LEDs.

By applying the backlight unit of this embodiment as a backlight for a liquid crystal display device or another, the brightness provided by the LEDs becomes lower and lower toward the peripheral portion, thereby making the central portion relatively brighter and the peripheral portion darker as a whole backlight unit, thus a display device having brightness distribution similar to the brightness distribution characteristics of a cathode-ray tube can be obtained.

In still another embodiment, as shown in FIG. 24B, fluorescent lamps 59 may be added as the light source together with LEDs 56. In this case, LEDs 56 and fluorescent lamps 59 are arranged so that the brightness for the darkest peripheral portion is secured by fluorescent lamps 59, while the brightness for the brightest central portion is secured by LEDs 56. By using LEDs 56, the brightness of the whole screen is also improved. Further, fluorescent lamps 59 may have, for example, partial uneven brightness which reflects the shape of a fluorescent lamp, and also intrinsic uneven brightness in the longitudinal direction of a linear fluorescent lamp, however, such uneven brightness can be solved by using LEDs 56. A desirable brightness distribution can be obtained by adjusting brightness distribution of fluorescent lamps 59 which are the linear light sources by using radiation brightness or surface density of LEDs 56 which are the point light source.

As clearly understood by the descriptions provided above, according to the present invention, by providing the backlight unit with the brightness gradient forming means for forming brightness gradient at least in the horizontal and vertical directions so that relatively higher brightness can be obtained at the central portion of a display screen and in the vicinity thereof than the brightness at the peripheral portion of the screen of the liquid crystal panel to be illuminated by the light source constituting the backlight unit, a backlight unit with brightness distribution characteristics providing relatively higher brightness at the central portion of the screen and in the vicinity thereof than at peripheral portion of the screen, just like a display device using a cathode-ray tube, can be obtained. By using this backlight unit, a liquid crystal display device with brightness distribution characteristics providing relatively higher brightness at the central portion of the screen and in the vicinity thereof than at peripheral portion of the screen can be obtained. Further, by controlling image data to be supplied to the liquid crystal panel, or by controlling aperture ratio of the liquid crystal panel, a liquid crystal display device with brightness distribution characteristics providing relatively higher brightness at the central portion of the screen and in the vicinity thereof than at peripheral portion of the screen, just like a display device using a cathode-ray tube, can be obtained.

The invention claimed is:

1. A backlight unit for illuminating an object to be illuminated provided with at least two directional brightness gradients using a plurality of light sources disposed directly below the object to be illuminated, wherein the backlight unit has a reflection portion for causing the light from the plurality of light sources to exit toward a certain direction, wherein the reflection portion comprises at least a first and a second reflection layers having a predetermined level of light reflectance and transmittance, wherein the reflection portion consists of a first region with the first and second reflection layers being overlapped in the incident direction of light located at a position equivalent to the central portion of the object to be illuminated and a second region consisting of the first reflection layer only, and wherein the brightness gradient is formed in the horizontal and vertical directions of the object to be illuminated by controlling reflectance of the reflection portion using the first region with relatively higher reflectance and the second region with lower reflectance than the first region.

2. A backlight unit for illuminating an object to be illuminated provided with at least two directional brightness gradients using a plurality of light sources disposed directly below the object to be illuminated, wherein the backlight unit has a reflection portion for causing the light from the plurality of light sources to exit toward a certain direction, wherein the reflection portion comprises at least a first and a second reflection layers having a predetermined level of light reflectance and transmittance, wherein the reflection portion consists of a first region with the first and second reflection layers being overlapped in the incident direction of light located at a position equivalent to the central portion in the horizontal direction on the surface to be illuminated , and a second region consisting of the first reflection layer only located at both ends, and wherein the brightness gradient is formed in the horizontal and vertical directions on the surface to be illuminated by controlling reflectance of the reflection portion in the horizontal direction on the surface to be illuminated and also by making the brightness of the light sources located at the position equivalent to the central portion in the vertical direction on the surface to be illuminated relatively higher than the brightness of the light sources located at both ends, using the first region wit relatively higher reflectance and the second region with lower reflectance than the first region.

3. A backlight unit for illuminating an object to be illuminated provided with at least two directional brightness gradients using a plurality of light sources disposed directly below the object to be illuminated, wherein the backlight unit has a reflection portion for causing the light from the plurality of light sources to exit toward a certain direction, wherein the reflection portion comprises at least a first and a second reflection layers having a predetermined level of light reflectance and transmittance, wherein the reflection portion consists of a first region with the first and second reflection layers overlapped in the incident direction of light located at a position equivalent to the central portion in the vertical direction on the surface of the object to be illuminated and a second region consisting of the first reflection layer only located at the both ends, and wherein a brightness gradient is formed in the horizontal and vertical directions on the surface of the object to be illuminated by controlling reflectance of the reflection portion in the vertical direction on the surface to be illuminated and also by making the brightness of the light sources located at the position equivalent to the central portion in the horizontal direction on the surface to be illuminated relatively higher tan the brightness of the light sources located at both ends, using the first region with relatively higher reflectance and the second region with lower reflectance than the first region.

4. A backlight unit for illuminating an object to be illuminated provided with at least two directional brightness gradients using a plurality of light sources disposed directly below the object to be illuminated, wherein the backlight unit has a reflection portion for causing the light from the plurality of light sources to exit toward a certain direction, wherein the reflection portion comprises at least a first and a second reflection layers having a predetermined level of light reflectance and transmittance, wherein the reflection portion consists of a first region wit the first and second reflection layers being overlapped in the incident direction of light located at a position equivalent to the central portion in the horizontal direction on the surface of the object to be illuminated, and a second region consisting of the first reflection layer only located at both ends, and wherein a brightness gradient is formed in the horizontal and vertical directions on the surface of the object to be illuminated by controlling reflectance of the reflection portion in the horizontal direction on the surface to be illuminated and also by making the clearance of the light sources located at the position equivalent to the central portion in the vertical direction on the surface to be illuminated relatively smaller than the clearance of the light sources located at both ends, using the first region with relatively higher reflectance and the second region with lower reflectance than the first region.

5. A backlight unit for illuminating an object to be illuminated provided with at least two directional brightness gradients using a plurality of light sources disposed directly below the object to be illuminated, wherein the backlight unit has a reflection portion for causing the light from the plurality of light sources to exit toward a certain direction, wherein the reflection portion comprises at least a first and a second reflection layers having a predetermined level of light reflectance and transmittance, wherein the reflection portion consists of a first region wit the first and second reflection layers overlapped in the incident direction of light located at a position equivalent to the central portion in the vertical direction on the surface of the object to be illuminated and a second region consisting of the first reflection layer only located at the both ends, and wherein the brightness gradient is formed in the horizontal and vertical directions on the surface of the object to be illuminated by controlling reflectance of the reflection portion in the vertical direction on the surface to be illuminated and also by making the clearance of the light sources located at the position equivalent to the central portion in the horizontal direction on the surface to be illuminated relatively smaller than the clearance of the light sources located at both ends, using the first region with relatively higher reflectance and the second region with lower reflectance than the first region.

6. A liquid crystal display device comprising the backlight unit of claim 1 and a liquid crystal panel to be illuminated by the backlight unit.

7. A liquid crystal display device comprising the backlight unit of claim 2 and a liquid crystal panel to be illuminated by the backlight unit.

8. A liquid crystal display device comprising the backlight unit of claim 3 and a liquid crystal panel to be illuminated by the backlight unit.

9. A liquid crystal display device comprising the backlight unit of claim 4 and a liquid crystal panel to be illuminated by the backlight unit.

10. A liquid crystal display device comprising the backlight unit of claim 5 and a liquid crystal panel to be illuminated by the backlight unit.

* * * * *